United States Patent
Schechter et al.

(10) Patent No.: US 10,417,281 B2
(45) Date of Patent: Sep. 17, 2019

(54) QUERYING A DATA SOURCE ON A NETWORK

(71) Applicant: Ab Initio Technology LLC, Lexington, MA (US)

(72) Inventors: Ian Schechter, Sharon, MA (US); Glenn John Allin, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 287 days.

(21) Appl. No.: 14/752,094

(22) Filed: Jun. 26, 2015

(65) Prior Publication Data

US 2016/0239582 A1 Aug. 18, 2016

Related U.S. Application Data

(60) Provisional application No. 62/117,588, filed on Feb. 18, 2015.

(51) Int. Cl.
*G06F 17/30* (2006.01)
*G06F 16/901* (2019.01)
(Continued)

(52) U.S. Cl.
CPC ...... *G06F 16/9024* (2019.01); *G06F 16/2452* (2019.01); *G06F 16/24542* (2019.01); *G06F 16/25* (2019.01)

(58) Field of Classification Search
CPC ............................................. G06F 17/30958
See application file for complete search history.

(56) References Cited

U.S. PATENT DOCUMENTS

| | | |
|---|---|---|
| 4,586,137 A | 4/1986 | Frost |
| 5,088,034 A | 2/1992 | Ihara et al. |

(Continued)

FOREIGN PATENT DOCUMENTS

| | | |
|---|---|---|
| CA | 2259362 | 1/1998 |
| CN | 1786950 | 6/2006 |

(Continued)

OTHER PUBLICATIONS

Transaction History, U.S. Appl. No. 09/229,849, filed Mar. 25, 2016 (3 pages).

(Continued)

*Primary Examiner* — Hung D Le
(74) *Attorney, Agent, or Firm* — Fish & Richardson P.C.

(57) ABSTRACT

Among other things, we describe a computer-implemented method, performed by a data processing system, of executing a computer program based on a query that is expressed in accordance with a query language applicable to a relational database, the computer program executed based at least in part on data stored in a tangible, non-transitory computer-readable medium, the executing including receiving a SQL query, where the SQL query includes an identifier associated with a resource that is external to the data processing system, generating a computer program based on the SQL query, and executing the computer program, causing transmitting one or more instructions to the resource, the instructions defining operations other than operations of the SQL query, and receiving data from the resource in response to the instructions.

47 Claims, 14 Drawing Sheets

(51) Int. Cl.
  *G06F 16/2453* (2019.01)
  *G06F 16/25* (2019.01)
  *G06F 16/2452* (2019.01)

(56) References Cited

U.S. PATENT DOCUMENTS

| | | |
|---|---|---|
| 5,151,991 A | 9/1992 | Iwasawa et al. |
| 5,313,584 A | 5/1994 | Tickner et al. |
| 5,347,639 A | 9/1994 | Rechtschaffen et al. |
| 5,367,619 A | 11/1994 | Dipaolo et al. |
| 5,446,915 A | 8/1995 | Pierce |
| 5,475,842 A | 12/1995 | Gilbert et al. |
| 5,475,843 A | 12/1995 | Halviatti et al. |
| 5,546,576 A | 8/1996 | Cochrane et al. |
| 5,574,898 A | 11/1996 | Leblang et al. |
| 5,588,150 A | 12/1996 | Lin et al. |
| 5,600,833 A | 2/1997 | Senn et al. |
| 5,619,692 A | 4/1997 | Malkemus et al. |
| 5,632,022 A | 5/1997 | Warren et al. |
| 5,678,044 A | 10/1997 | Pastilha et al. |
| 5,682,537 A | 10/1997 | Davies et al. |
| 5,706,509 A | 1/1998 | Man-Hak Tso |
| 5,712,971 A | 1/1998 | Stanfill et al. |
| 5,734,886 A | 3/1998 | Grosse et al. |
| 5,752,196 A | 5/1998 | Ahvenainen et al. |
| 5,768,564 A | 6/1998 | Andrews et al. |
| 5,799,149 A | 8/1998 | Brenner et al. |
| 5,819,021 A | 10/1998 | Stanfill et al. |
| 5,870,743 A | 2/1999 | Cohen et al. |
| 5,901,353 A | 5/1999 | Pentikainen |
| 5,909,681 A | 6/1999 | Passera et al. |
| 5,930,723 A | 7/1999 | Heiskari et al. |
| 5,935,216 A | 8/1999 | Benner et al. |
| 5,956,074 A | 9/1999 | Gautam et al. |
| 5,966,072 A | 10/1999 | Stanfill et al. |
| 5,999,729 A | 12/1999 | Tabloski, Jr. et al. |
| 6,031,993 A | 2/2000 | Andrews et al. |
| 6,077,313 A | 6/2000 | Ruf |
| 6,205,465 B1 | 3/2001 | Schoeing et al. |
| 6,253,371 B1 | 6/2001 | Iwasawa et al. |
| 6,266,804 B1 | 7/2001 | Isman |
| 6,295,518 B1 | 9/2001 | McLain et al. |
| 6,311,265 B1 | 10/2001 | Beckerle et al. |
| 6,330,008 B1 | 12/2001 | Razdow et al. |
| 6,345,267 B1 | 2/2002 | Lohman et al. |
| 6,415,286 B1 | 7/2002 | Passera et al. |
| 6,453,464 B1 | 9/2002 | Sullivan |
| 6,615,203 B1 | 9/2003 | Lin et al. |
| 6,625,593 B1 | 9/2003 | Leung et al. |
| 6,694,306 B1 | 2/2004 | Nishizawa et al. |
| 6,785,668 B1 | 8/2004 | Polo et al. |
| 6,915,290 B2 | 7/2005 | Bestgen et al. |
| 7,047,232 B1 | 5/2006 | Serrano |
| 7,080,062 B1 | 7/2006 | Leung et al. |
| 7,111,019 B1 | 9/2006 | Nishizawa |
| 7,133,861 B2 | 11/2006 | Day et al. |
| 7,164,422 B1 | 1/2007 | Wholey, III et al. |
| 7,167,850 B2 | 1/2007 | Stanfill |
| 7,249,120 B2 | 7/2007 | Bruno et al. |
| 7,359,922 B2 | 4/2008 | Young-Lai et al. |
| 7,428,532 B2 * | 9/2008 | Styles ................ G06F 17/2247 |
| 7,464,084 B2 | 12/2008 | Huang et al. |
| 7,584,205 B2 | 9/2009 | Stanfill et al. |
| 7,664,730 B2 | 2/2010 | Ziauddin et al. |
| 7,856,462 B2 | 12/2010 | Huang et al. |
| 7,945,562 B2 | 5/2011 | Ahmed et al. |
| 7,953,891 B2 | 5/2011 | Blaszczak et al. |
| 8,122,088 B2 | 2/2012 | Banatwala |
| 8,204,903 B2 * | 6/2012 | Bowers ............ G06F 17/30401 |
| | | 707/713 |
| 8,412,746 B2 | 4/2013 | Fox et al. |
| 8,510,316 B2 | 8/2013 | Shimizu |
| 8,538,985 B2 | 9/2013 | Betawadkar-Norwood et al. |
| 8,666,966 B2 * | 3/2014 | Ranganathan .... G06F 17/30445 |
| | | 707/713 |
| 8,688,683 B2 * | 4/2014 | Simon ............... G06F 17/30463 |
| | | 707/713 |
| 8,782,081 B2 * | 7/2014 | Guan .................. G06F 17/3056 |
| | | 707/779 |
| 8,850,574 B1 | 9/2014 | Ansel |
| 8,875,145 B2 | 10/2014 | Atterbury et al. |
| 9,128,983 B2 * | 9/2015 | Cheng ............... G06F 17/30442 |
| 9,177,022 B2 * | 11/2015 | Taranov ............ G06F 17/30448 |
| 9,317,551 B1 * | 4/2016 | Zander ............. G06F 17/30864 |
| 9,348,866 B2 | 5/2016 | Tanaka |
| 9,477,778 B2 * | 10/2016 | Hammerschmidt ........................ G06F 17/30935 |
| 2001/0011371 A1 | 8/2001 | Tang |
| 2003/0041052 A1 * | 2/2003 | Gajda ................ G06F 17/3041 |
| 2003/0093410 A1 | 5/2003 | Couch et al. |
| 2003/0120682 A1 | 6/2003 | Bestgen et al. |
| 2005/0038778 A1 * | 2/2005 | Styles ................ G06F 17/2247 |
| 2005/0108209 A1 | 5/2005 | Beyer et al. |
| 2005/0278152 A1 | 12/2005 | Blaszczak |
| 2006/0095466 A1 | 5/2006 | Stevens et al. |
| 2006/0265362 A1 | 11/2006 | Bradford |
| 2006/0294150 A1 | 12/2006 | Stanfill et al. |
| 2007/0067274 A1 | 3/2007 | Han et al. |
| 2007/0186036 A1 | 8/2007 | Bittner |
| 2007/0271381 A1 | 11/2007 | Wholey et al. |
| 2008/0049022 A1 | 2/2008 | Sherb et al. |
| 2008/0052299 A1 | 2/2008 | Shinke et al. |
| 2008/0151749 A1 | 6/2008 | Kawamura |
| 2008/0256014 A1 | 10/2008 | Gould et al. |
| 2008/0270646 A1 | 10/2008 | Wong |
| 2009/0055370 A1 | 2/2009 | Dagum et al. |
| 2009/0083313 A1 | 3/2009 | Stanfill et al. |
| 2009/0125887 A1 | 5/2009 | Kahlon et al. |
| 2009/0132474 A1 * | 5/2009 | Ma .................... G06F 17/30451 |
| 2009/0222404 A1 | 9/2009 | Dolin et al. |
| 2009/0225082 A1 | 9/2009 | Hargrove et al. |
| 2009/0254774 A1 | 10/2009 | Chamdani et al. |
| 2010/0005077 A1 | 1/2010 | Krishnamurthy et al. |
| 2010/0057695 A1 | 3/2010 | Kirovski |
| 2010/0121868 A1 * | 5/2010 | Biannic ............ G06F 17/30389 |
| | | 707/759 |
| 2010/0211577 A1 | 8/2010 | Shimizu |
| 2010/0211953 A1 | 8/2010 | Wakeling et al. |
| 2010/0295833 A1 * | 11/2010 | Nishio ................ G06F 3/0412 |
| | | 345/207 |
| 2011/0010358 A1 | 1/2011 | Zane |
| 2011/0029571 A1 | 2/2011 | Aggarwal et al. |
| 2011/0072319 A1 | 3/2011 | Agarwal et al. |
| 2011/0131199 A1 * | 6/2011 | Simon ............... G06F 17/30463 |
| | | 707/714 |
| 2011/0179014 A1 | 7/2011 | Schechter et al. |
| 2011/0179404 A1 | 7/2011 | Allen |
| 2011/0208690 A1 | 8/2011 | Cushing |
| 2011/0246448 A1 | 10/2011 | Tatemura et al. |
| 2011/0276789 A1 | 11/2011 | Chambers et al. |
| 2012/0054173 A1 * | 3/2012 | Andrade ........... G06F 17/30516 |
| | | 707/714 |
| 2012/0095987 A1 * | 4/2012 | Cheng ............... G06F 17/30442 |
| | | 707/713 |
| 2012/0246158 A1 | 9/2012 | Ke et al. |
| 2012/0290620 A1 * | 11/2012 | Guan ................ G06F 17/30389 |
| | | 707/779 |
| 2013/0144867 A1 | 6/2013 | Tanaka |
| 2013/0246864 A1 | 9/2013 | Ananthapadmanabh et al. |
| 2014/0019949 A1 | 1/2014 | Craymer |
| 2014/0032617 A1 | 1/2014 | Stanfill |
| 2014/0280037 A1 | 9/2014 | Petride et al. |
| 2014/0330827 A1 | 11/2014 | Wu |

FOREIGN PATENT DOCUMENTS

| | | |
|---|---|---|
| CN | 1790324 | 6/2006 |
| CN | 101548281 | 9/2009 |
| EP | 0421408 | 4/1991 |
| EP | 2110761 | 10/2009 |
| EP | 2251785 | 11/2010 |
| FI | 944887 | 7/1997 |
| FI | 945495 | 9/1997 |

(56) References Cited

FOREIGN PATENT DOCUMENTS

| | | | |
|---|---|---|---|
| FI | 951270 | 10/1997 | |
| JP | 3-126169 | 5/1991 | |
| JP | 8-16429 | 1/1996 | |
| JP | 10-232875 | 9/1998 | |
| JP | 10-340276 | 12/1998 | |
| JP | 2000148699 | 5/2000 | |
| JP | 2001-273327 | 10/2001 | |
| JP | 2003-505766 | 2/2003 | |
| JP | 2003-099441 | 4/2003 | |
| JP | 2006-236360 | 9/2006 | |
| JP | 2009-181577 | 8/2009 | |
| WO | 97/23826 | 7/1997 | |
| WO | WO 2007061430 A1 * | 5/2007 | ....... G06F 17/30427 |

OTHER PUBLICATIONS

Transaction History, U.S. Appl. No. 13/098,823, filed Mar. 25, 2016 (4 pages).
Transaction History, U.S. Appl. No. 14/563,066, filed Mar. 25, 2016 (1 page).
Transaction History, U.S. Appl. No. 14/628,643, filed Mar. 25, 2016 (1 page).
Transaction History, U.S. Appl. No. 12/688,316, filed Mar. 25, 2016 (3 pages).
International Search Report & Written Opinion, Patent Cooperation Treaty, issued in PCT application No. PCT/US2011/021260, dated Apr. 18, 2011, 12 pages.
International Preliminary Report on Patentability, PCT/US2011/021260, dated May 24, 2012.
International Search Report & Written Opinion, PCT/US2012/035762, dated Feb. 19, 2013, 14 pages.
Japanese Office Action, with English translation, JP Application No. 2012-549105, dated Apr. 22, 2014, 9 pages.
Japanese Office Action, with English translation, JP 2012-549105, dated Mar. 25, 2015.
Josifovski, Vanja, et al., "Optimizing Queries in Distributed and Composable Mediators." Cooperative Information Systems, 1999. COOPIS '99 Proceedings, 1999 I FCIS International Conference in Ediburgh, UK Sep. 2-4, 1999. Sep. 2, 1999, pp. 291-302.
Levy et al., "Querying Heterogeneous Information Sources Using Source Descriptions", Proceedings of the 22$^{nd}$ VLDB Conference, Mumbai (Bombay), India, pp. 251-262, 1996.
Li et al., "Load Balancing Problems for Multiclass Jobs in Distributed/Parellel Computer Systems", IEEE, vol. 47, No. 3, pp. 322-332, (Mar. 1998).
Mackert et al., "R* Optimizer Validation and Performance Evaluation for Distributed Queries", Proceedings of the Twelfth International Conference on Very Large Data Bases, Kyoto, pp. 149-159, Aug. 1986.
Notice of Reasons for Rejection issued in Japanese Application No. 2000-594025, dated Mar. 29, 2005, 3 pages.
"Relational algebra", http//en.wikipedia.org/wiki/Relational_algebra, Feb. 5, 2010.
Rim et al., "An Efficient Dynamic Load Balancing Using the Dimension Exchange Method for Balancing Quantized Loads on Hypercube Multiprocessors", IEEE, pp. 708-712 (1999).
Selinger et al., "Access Path Selection in a Relational Database Management System", ACM, pp. 23-34, 1979.
Seshadri, Sangeetha, et al., "Optimizing Multiple Queries in Distributed Data Stream Systems." Proceedings of the 22$^{nd}$ International Conference on Data Engineering Workshops (ICDEW '06), Apr. 3, 2006, 6 pages.
Stanfill, Craig, "Massively Parallel Information Retrieval for Wide Area Information Servers", IEEE, pp. 679-682 (1991).
Stanfill, Craig, "The Marriage of Parallel Computing and Information Retrieval", IEEE, (2003).
Tjan, Bosco S., et al., "A Data-Flow Graphical User Interface for Querying a Scientific Database," 12602 Proceedings 1993 Symposium on Visual Languages, Aug. 24-27, 1993, 6 pages.
Torrent Technical White Paper, "Orchestrator for the SAS System—Delivering Scalability and Performance to SAS Applications," pp. 1-30.
Japanese Office Action (English Translation) in Application No. 2014-509333, dated Mar. 24, 2016 (9 pages).
European Office Action in Application No. 12721999.6, dated Nov. 11, 2016 (10 pages).
Garcia-Molina et al., "Database Systems the Complete Book Second Edition—Chapter 16—The Query Compiler," Pearson Prentice Hall, XP055315926, Jun. 15, 2008.
Ozsu et al., "Principles of Distributed Database Systems—Chapter 9—Multidatabase Query Processing", Principles of Distributed Database Systems: Third Edition, Springer New York, NY XP055267246, Mar. 2, 2011.
Adamos, Panayiotis, et al., "Architectural Principles of the 'Streamonas' Data Stream Management System and Performance Evaluation based on the Linear Road Benchmark." 2008 International Conference on Computer Science and Software Engineering, Dec. 12, 2008, pp. 643-646.
Afrati et al., "Performance Considerations on a Random Graph Model for Parellel Processing", Informatique Theorique et Applications, vol. 27, No. 4, pp. 367-388, (1993).
Aho et al., "Universality of Data Retrieval Languages", ACM, pp. 110-120. 1979.
Apers et al., "PRISMA/DB: A Parallel, Main Memory Relational DDBM", IEEE, pp. 541-554 (1992).
Bodin, Francois et al., "A User Level Program Transformation Tool," ACM 1998, pp. 180-187.
Boral et al., "Prototyping Bubba: A Highly Parallel Database System", IEEE, vol. 2, No. 1 pp. 4-24, (Mar. 1990).
Braun, Peter, "Parallel Program Debugging Using Scalable Visualization",IEEE, pp. 699-708 (1995).
Cimitile et al., "Incremental migration strategies: Data flow analysis for wrapping," IEEE Comput. Soc. US., pp. 59-68, Oct. 12, 1998, XP10309754.
Canadian Office Action issued in application No. 2,2360,286, dated Jul. 27, 2005, 3 pages.
Chamberlin et al., "A History of Evaluation of System R", Communications of the ACM, vol. 24, No. 10, pp. 632-646, Oct. 1981.
Chinese Office Action issued in application No. 201180014176.7, dated Jan. 7, 2015 (English translation).
DeWitt et al., "Parallel Database Systems: The Future of High Performance Database Systems", Communications of the ACM, vol. 35, No. 6, pp. 85-98, Jun. 1992.
DeWitt et al., "The Gamma Database Machine Project", IEEE, vol. 2, No. 1, pp. 44-62, (Mar. 1990).
Flat File Database http://en.wikipedia.org/w/index.php?title+Flat_file_database&oldid_336589178 as of Jan. 8, 2010.
Forrester Research's Ellen Carney Names Compact Solutions Among "Hot Insurance Tech Companies—2009", Jun. 29, 2009.
Graefe, "Encapsulation of Parallelism in the Volcano Query Processing System", ACM pp. 102-111, 1990.
Graefe et al., "Encapsulation of Parallelism and Architecture Independence in Extensible Database Query Execution", IEEE, vol. 19, No. 8, pp. 749-764 (Aug. 1993).
Graefe, Goetze "Volcano—An Extensible and Parallel Query Evaluation System", IEEE, vol. 6, No. 1, pp. 120-135 (Feb. 1994).
International Preliminary Report on Patentability issued in PCT/US2016/018028, dated Aug. 22, 2017.
European Search Report in EP17202770, dated Mar. 22, 2018 (10 pages).
Maciej Pilecki, "Optimizing SQL Server Query Performance", XP055458550, retrieved from internet: technet.microsoft.com/en-us/library/2007.11sqiquery.aspx (Mar. 12, 2018) (8 pages).
Japanese Office Action in Japanese Application No. 2016-167897, dated Jun. 16, 2017, 4 pages (English Translation).
International Search Report and Written Opinion in Singapore Patent Application No. 11201705731T, dated Apr. 10, 2018.
Voruganti et al., "An Adaptive Data-Shipping Architecture for Client Caching Data Management Systems", Distributed and Parallel Databases, 15, 137-177 (2004).
Office Action issued in EP17202770.8 dated Feb. 25, 2019.

(56) References Cited

OTHER PUBLICATIONS

Summons to Attend Oral Proceedings issued in European Application No. 11702533.8, on Nov. 5, 2018.
"Variable (programming)," Wikipedia, XP05551470, Jun. 26, 2009 (retrieved from internet Oct. 12, 2018).
Zawodny, "High Performance MySQL", XP055514964, Dec. 31, 2008 (retrieved from internet Oct. 12, 2018) https://www.oreilly.com/library/view/high-performance-mysql/958056101718/ch04.html [retrieved on Oct. 12, 2018].

* cited by examiner

FIG. 3

```
1   type request_type=record
2       ascii string ("\0") request_url;
3       record                                                              ⎫
4           utf8 string ("\0") name;                                        ⎪
5           utf8 string ("\0") value;                                       ⎬ 442
6       end [big endian integer (4)] request_url_params = NULL;             ⎪
7       void (big endian integer (4)) request_body = NULL;                  ⎪
8   end; /*Metadata for records containing request information*/            ⎭
9
10  type response_type=record                                               ⎫
11      // The response_type field definitions are shown below.             ⎪
12      // The definitions are shown here for informational purposes only.  ⎪
13      // You cannot change the definition of response_type.               ⎬ 444
14      big endian integer (4) response_code;                               ⎪
15      ascii string (big endian integer (4)) response_headers = NULL;     ⎪
16      void (bigendian integer (4)) response_body = NULL;                  ⎪
17  end; /*Metadata for records containing response information*/           ⎭
18
19  type response_vector-type=response_type [int]; /*Response vector*/      ⎫
20                                                                          ⎪
21  request :: prepare_request (in) =                                       ⎬ 446
22  begin                                                                   ⎪
23      request.request_url :: "http://en.wikipedia.org/wiki/" + in.subject;⎪
24  end;                                                                    ⎭
25
26  out :: create_output (in, response) =                                   ⎫
27  begin                                                                   ⎪
28      out.* :: response.*;                                                ⎬ 448
29      out.subject :: in.subject;                                          ⎪
30  end;                                                                    ⎭
```

FIG. 4C

| 504a | 504b | 504c | 504d | 504e | 504f | 504g |

Data Source: ws.wikipedia

| Info | Record Format | Indices | Keys | Parameters | Permissions | Statistics |
|---|---|---|---|---|---|---|

Name: wikipedia

Schema: ws

Data space:

Kind: query_engine

Data URL: ${AI_COMPONENTS}/wikipedia_qe_subg.mp   506

Subgraph path (sequential scan):

Insert subgraph path:

Allow sequential scan: ☑

Scan subgraph folds: ☑

Index subgraph folds: ☑

Subgraph interface version: 1

| Data Source: ws.wikipedia | | |
|---|---|---|
| 504b | | |
| Info | Record Format | Indices | Keys | Parameters | Permissions | Statistics | | |
| ⊙ Embedded Record Format | | |
| record utf8 string (' ') subject; utf8 string ('\n') line; end | | |
| 508 | | |
| ○ Record Format File | | |
| ✗ Clear 🔍 View | | |
| Fields: 510 | | |

| Name | Type | Size |
|---|---|---|
| A subject | String | NULL-delimited |
| A line | String | NULL-delimited |

| Data Source: ▷ ws.wikipedia | | | | |
|---|---|---|---|---|
| Info \| Record Format \| Indices \| Keys \| Parameters \| Permissions \| Statistics | | | | |
| Indices (1) + ✎ ✗ | | | | |
| Fields | Index URL | Kind | Subgraph Path | Is unique | Usable |
| subject | | exact | ${AI_COMPONENTS}/wikipedia_qe_subg.mp | | ✓ |

QUERYING A DATA SOURCE ON A NETWORK

CLAIM OF PRIORITY

This application claims priority to U.S. patent application Ser. No. 62/117,588, filed on Feb. 18, 2015, the entire contents of which are hereby incorporated by reference.

BACKGROUND

This description relates to querying a data source on a network, e.g., using SQL or another type of query language.

A query to a data source specifies data to be retrieved from the data source. The query can be provided to the data source (e.g., a database) and a data processing system associated with the data source (e.g., a database management system) can return the data specified by the query. Various techniques can be used to parse the query to identify the data in the data source specified by the query.

SUMMARY

Aspect 1 is a computer-implemented method, performed by a data processing system, of executing a computer program based on a query that is expressed in accordance with a query language applicable to a relational database, the computer program executed based at least in part on data stored in a tangible, non-transitory computer-readable medium, the executing including receiving a SQL query, where the SQL query includes an identifier associated with a resource that is external to the data processing system; generating a computer program based on the SQL query, including identifying configuration data associated with the resource, the configuration data specifying at least one value used in communicating with the resource; and executing the computer program, based on the configuration data, the execution of the computer program causing transmitting one or more instructions to the resource, the instructions defining operations other than operations of the SQL query, and receiving data from the resource in response to the instructions.

Aspect 2 is the method of aspect 1 in which the portion of the computer program includes executable instructions that define a manner in which the resource is accessed, where the executable instructions operate based on the configuration data provided to the portion of the computer program.

Aspect 3 is the method of aspects 1 or 2 in which the configuration data is specified in a catalog that can be updated based on a change to a data format used by the resource.

Aspect 1 is the method of any of aspects 1, 2, or 3, including generating parameter values based on the configuration data; and providing the parameter values to a portion of the computer program, the portion being capable of communicating with the resource; the execution of the computer program being based on the parameter values.

Aspect 5 is the method of aspect 4 in which generating parameter values based on the configuration data includes executing a parameter generator which generates a parameter file in a format readable by the portion of the computer program, and in which providing the parameter values to the portion of the computer program includes making the parameter file available to the portion of the computer program.

Aspect 6 is the method of any of aspects 1 through 5 in which the SQL query includes a SELECT statement that includes an argument, where at least a portion of the argument corresponds to the identifier associated with the resource.

Aspect 7 is the method of any of aspects 1 through 6 in which the computer program includes components representing operations of the SQL query.

Aspect 8 is the method of any of aspects 1 through 6 in which the computer program is a dataflow graph and the portion of the computer program is a subgraph of the dataflow graph.

Aspect 9 is the method of any of aspects 1 through 8 in which the resource is accessed using an application programming interface (API) exposed by the resource.

Aspect 10 is the method of aspect 9 including causing functions of the API to be executed in response to receiving the SQL query, the functions of the API being executable at the resource, and the instructions transmitted to the resource causing the functions of the API to be executed.

Aspect 11 is the method of any of aspects 1 through 10 including formatting the data received from the external resource in the form of a database table.

Aspect 12 is the method of any of aspects 1 through 11 in which the resource is not a relational database management system.

Aspect 13 is the method of any of aspects 1 through 12 in which the instructions are transmitted to a facility of the resource that does not return results in response to a SQL query.

Aspect 14 is the method of any of aspects 1 through 13 in which the data received from the resource in response to the instructions includes data specified by the SQL query.

Aspect 15 is the method of any of aspects 1 through 14 including identifying records and fields in the data received from the resource in response to the instructions, the records and fields identified based on a record format associated with the resource that is external to the data processing system.

Other aspects can include corresponding apparatus, systems, and computer readable storage devices.

Aspects can include one or more of the following advantages. A data processing system can execute a query that references a resource external to the data processing system (e.g., one available on the Internet) and is not a relational database management system.

Data distributed across networks (e.g. large networks such as the Internet) can be efficiently be made accessible by using database programming languages (e.g. SQL), even though the data sources in the network may not be responsive to the database language or may not be relational databases. This may provide a flexible search scheme that can be especially adapted to the particular data sources and can thereby be used in networks with data sources that are changing over time. In turn, this may allow distributed networks to more rapidly be developed (e.g. by scaling up or down the number of data sources, or by exchanging or modifying data sources) while maintaining access to the data stored in the current data sources of the developed network.

Other features and advantages of the invention will become apparent from the following description, and from the claims.

DESCRIPTION OF DRAWINGS

FIG. 3 shows a user interface for executing a query.

FIG. 4C shows executable code of a component.

FIGS. 5A-5C show contents of a catalog of external resources.

DESCRIPTION

A data processing system can convert a query (such as a SQL query) into a computer program such as a dataflow graph. The computer program includes components which, when executed, carry out operations (e.g., data processing operations) equivalent to operations specified by the query.

Figure 1:
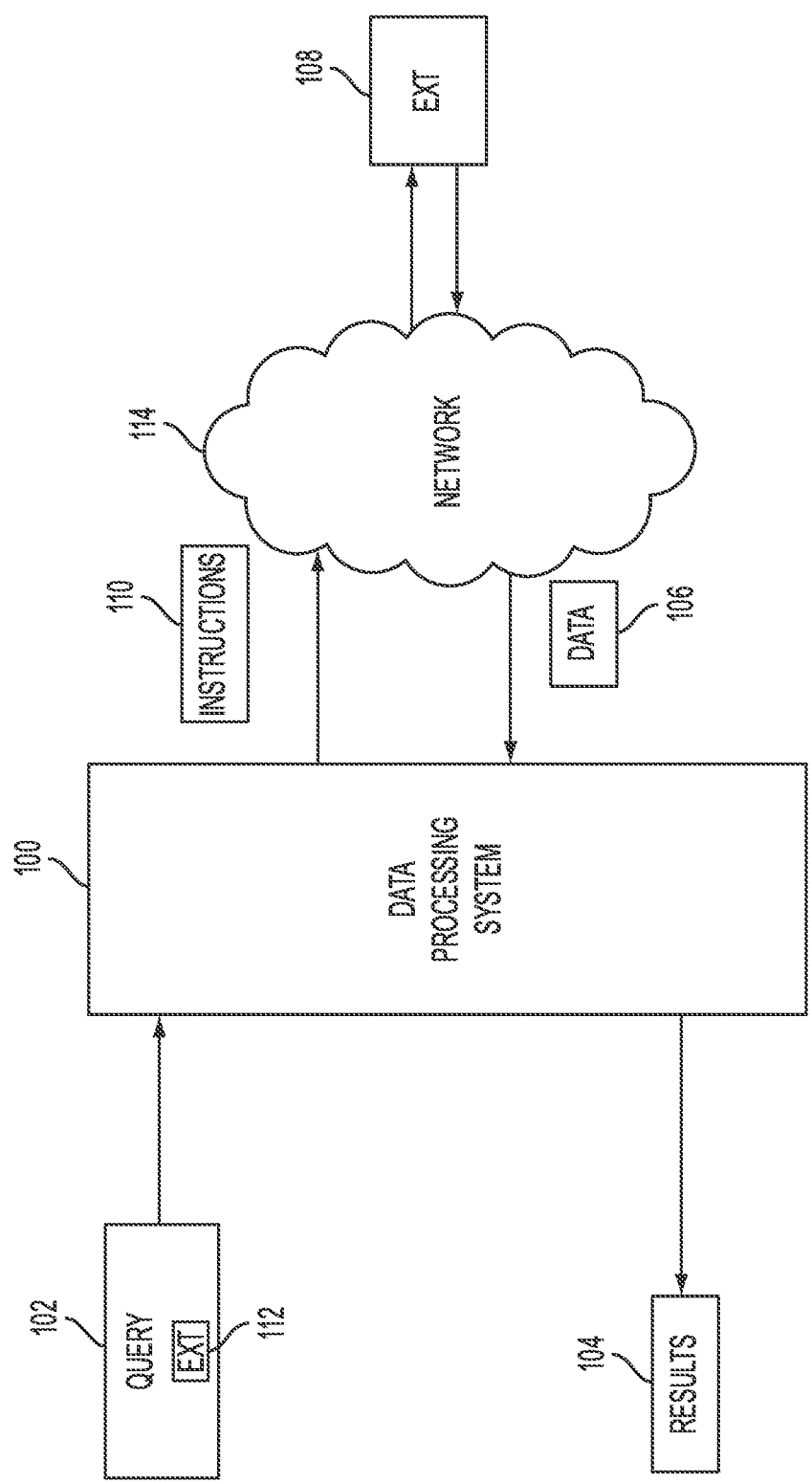
FIG. 1 shows a data processing system that can process a query.

FIG. 1 shows a data processing system 100 that can process a query 102 to generate results 104 specified by the query 102. The results 104 are based on data 106 received from an external resource 108 referenced by the original query 102. The data processing system 100 receives the data 106 in response to instructions 110 that the data processing system 100 generates based on the query 102 and sends to the external resource 108.

A query 102 is used to retrieve data specified by the query. One type of query 102 is a structured query language (SQL) query. This description will use SQL queries as an example, but the techniques described here could also be used with other types of queries such as multidimensional expressions (MDX) queries.

A SQL query (also referred to as SQL statements) uses commands and syntax defined by the structured query language (SQL). In general, a query is a statement that specifies a subset of data in one or more datasets that are indicated in the query. The specified subset can be returned by a system that processes the query to the system that issued the query. The data specified by the query and returned in response to the query is generally a portion of the total data stored in the dataset indicated by the query. An example of a SQL query could be "SELECT last_name FROM current_customers." This SQL query includes an operation, SELECT, which instructs a system executing the query to retrieve data according to the arguments of the SELECT operation. In the syntax of SQL, the arguments are "current_customers," which is a set of data such as a database table, and "last_name," which is a column of the database table. When a system interprets the query and executes the operations of the query, the system will return the data of the last_name column (e.g., each portion of data contained in the last_name column) in response to the query. SQL is described in detail in "SQL Bible, $2^{nd}$ Edition" by Alex Kriegel and Boris Trukhnov, published Apr. 7, 2008, ISBN 978-0470229064, hereby incorporated by reference.

A typical example of a resource that returns data in response to a query is a relational database. A relational database is a collection of one or more database tables and a system that manages data processing operations such as interpreting SQL queries, reading data from the tables, writing data to the tables, and performing other kinds of data processing functions. A database table is a collection of data arranged in a) rows each representing a record and b) columns each representing a category of data stored in the rows. For example, a database table called "current_customers" may have rows each representing a current customer of a business and may have columns representing categories of data such as name of the customer, address of the customer, last product purchased by the customer, and so on.

A relational database table a kind of database table that stores data in the form of tuples, each of which is made up of elements of data corresponding to attributes. A tuple can take the form of a row in the relational database, and an attribute can take the form of a column in the relational database. Thus, each tuple contains elements of data (sometimes called attribute values) each corresponding to one of the attributes of the database table. Further, a grouping of multiple tuples is sometimes called a relation.

A relational database management system (RDBMS) is a system that processes instructions directed to creating and modifying data stored in the relational database. An RDBMS includes functionality for interpreting a query and returning data specified by the query. The combination of interpreting a query and returning data specified by the query is sometimes referred to as executing the query. For example, some RDBMS implementations include an engine which a) parses a SQL query, b) identifies operations that are defined by the structured query language, c) identifies arguments of the commands, and d) carries out (e.g., executes) the operations according to the arguments.

As described above, the SQL query "SELECT last_name FROM current_customers, includes an operation, SELECT, which instructs an RDBMS to retrieve data according to the arguments of the SELECT operation. The arguments are "current_customers," which is a database table managed by the RDBMS, and "last_name," which is a column of the database table. When the RDBMS interprets the query and executes the operations of the query, the RDBMS will return the data of the last_name column (e.g., each portion of data contained in the last_name column) in response to the query. In some implementations of an RDBMS, a module called a query planner will identify the operations to be carried out. In this way, SQL is a query language applicable to a relational database, e.g., applicable to data maintained by an RDBMS.

The external resource 108 is external to the data processing system 100. (Some components of the data processing system 100 are shown in detail in FIGS. 2A-2C). For example, the external resource 108 could be a facility that communicates using a network (e.g., the Internet). The data processing system 100 communicates with the external resource 108 by sending data to, and receiving data from, a network. The external resource 108 may include sets of data such as database tables, data files, or other data structures stored on storage media, e.g., tangible, non-transitory computer-readable media.

The data processing system 100 is capable of generating results 104 specified by the query 102 even if the external resource 108 specified by the query 102 does not include an RBDMS. Put another way, the external resource 108 need not be an RDBMS or include an RDBMS among its components. Some examples of the external resource 108 will include an RDBMS while other examples of the external resource 108 will not include an RDBMS.

In use, the data processing system 100 generates a computer program 108 (sometimes referred to as a data processing program) based on the query 102. For example, the computer program 108 can be generated using an engine (e.g., an engine that forms a subsystem of the data processing system 100) that takes a query as input and produces a dataflow graph as output. Although a dataflow graph is used as an example here, the computer program can be any kind of program that includes program code that can be executed to carry out instructions represented by the program code.

In this way, a computer program such as the computer program 108 shown in FIG. 1 can, when executed, produce the same output as the execution of the corresponding query 102, e.g., by a database management system such as an RDBMS. Thus, a query 102 can be written using a query language such as SQL. However, the systems, e.g., subsystems of the data processing system 100, carrying out the corresponding data processing operations can execute the computer program 108 in order to perform operations that are equivalent to operations that would be performed by a system (e.g., an RDBMS) that executed the query 102. (Generally, an RDBMS does not have functionality capable of executing the computer program 108). When we say that two operations are equivalent, we mean that the two operations produce substantially the same output data when provided with the same input data. As an example, two operations may produce exactly the same output data when provided with the same input data. As an example, two operations provided with the same input data may produce output data that only differs in data formatting, e.g., one operation may produce comma-delimited output data, and an equivalent operation may produce tab-delimited output data that is otherwise identical to the comma-delimited output data.

The data processing system 100 can generate results 104 specified by a query 102 even if the query 102 includes a reference 112 to a data source other than an RDBMS. For example, the query 102 may reference an external resource 108 that is not an RDBMS. Because the external resource 108 is not an RDBMS, the external resource 108 is not associated with functionality for interpreting queries, e.g., SQL queries. In some implementations, the data processing system 100 can apply the query to data received from the external resource 108 if the data processing system 100 has access to a record format of data of the external resource 108. A record format (sometimes called a schema) is a description of the organization of a body of data.

The external resource 108 could be any source of data that is external to the data processing system 100. By external to the data processing system 100, we mean that the resource is not one of the components of the data processing system 100. (Some examples of components of the data processing system 100 are shown in detail in FIGS. 2A-2C). For example, the external resource 108 could be a facility that communicates using a network 114 (e.g., the Internet, represented here by a "cloud"). The data processing system 100 communicates with the external resource 108 by sending data to, and receiving data from, the network 114. In some examples, the external resource 108 could be a web site or another facility that communicates using Internet-based protocols such as TCP/IP or UDP/IP.

In some implementations, the external resource 108 may include an RDBMS that is not visible to the network 114. By this we mean that the external resource 108 may include a relational database management system that stores data of the external resource 108, but the relational database management system does not accept queries such as SQL queries that arrive by way of the network 114 except in limited cases (e.g., in cases such as by way of a system administrator interface that allows a system administrator to submit queries). For example, if the external resource 108 is a web site available on the Internet, then the external resource 108 may have a "back-end" relational database that stores data. In this example, the relational database does not accept SQL queries from a web browser interface, a mobile application, or other access techniques in use by many or most users of the external resource 108. Instead, the data of the external resource 108 is primarily accessed by way of a technique that does not include a SQL query, such as a hypertext transfer protocol (HTTP) request, or an instruction submitted by way of an application programming interface (API, described below), or another technique.

Because the external resource 108 does not interpret the query 102, the data processing system 100 determines instructions 110 to transmit to the external resource 108 that can be interpreted by the external resource 108. The instructions 110 are in a form other than in the form of the original query 102. For example, if the original query 102 is a SQL query, the instructions 110 are not a SQL query (e.g., the instructions 110 do not contain SQL commands or arguments). The data processing system 100 can determine what instructions 110 to send to the external resource 108 based on the query 102 and based on other information describing the external resource 108. In some implementations, the data processing system 100 has modules used to interpret the query 102 and generate results 104 specified by the query 102. In some implementations, the data processing system 100 generates a computer program that includes operations corresponding to operations that perform the query 102 and, when executed, sends the instructions 110 to the external resource 108.

Figure 2A:
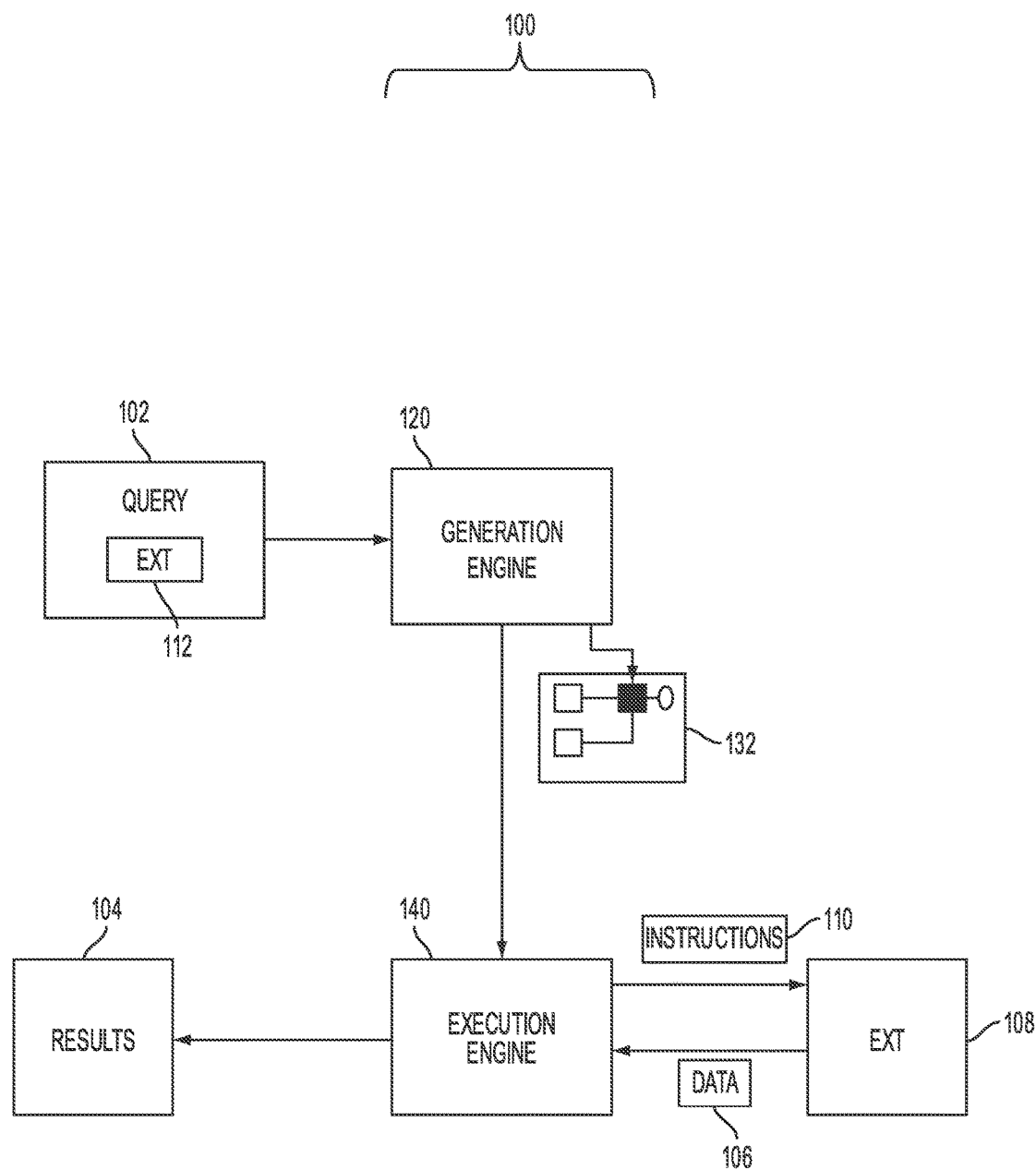
FIGS. 2A-2C show elements of the data processing system.
Figure 2B:
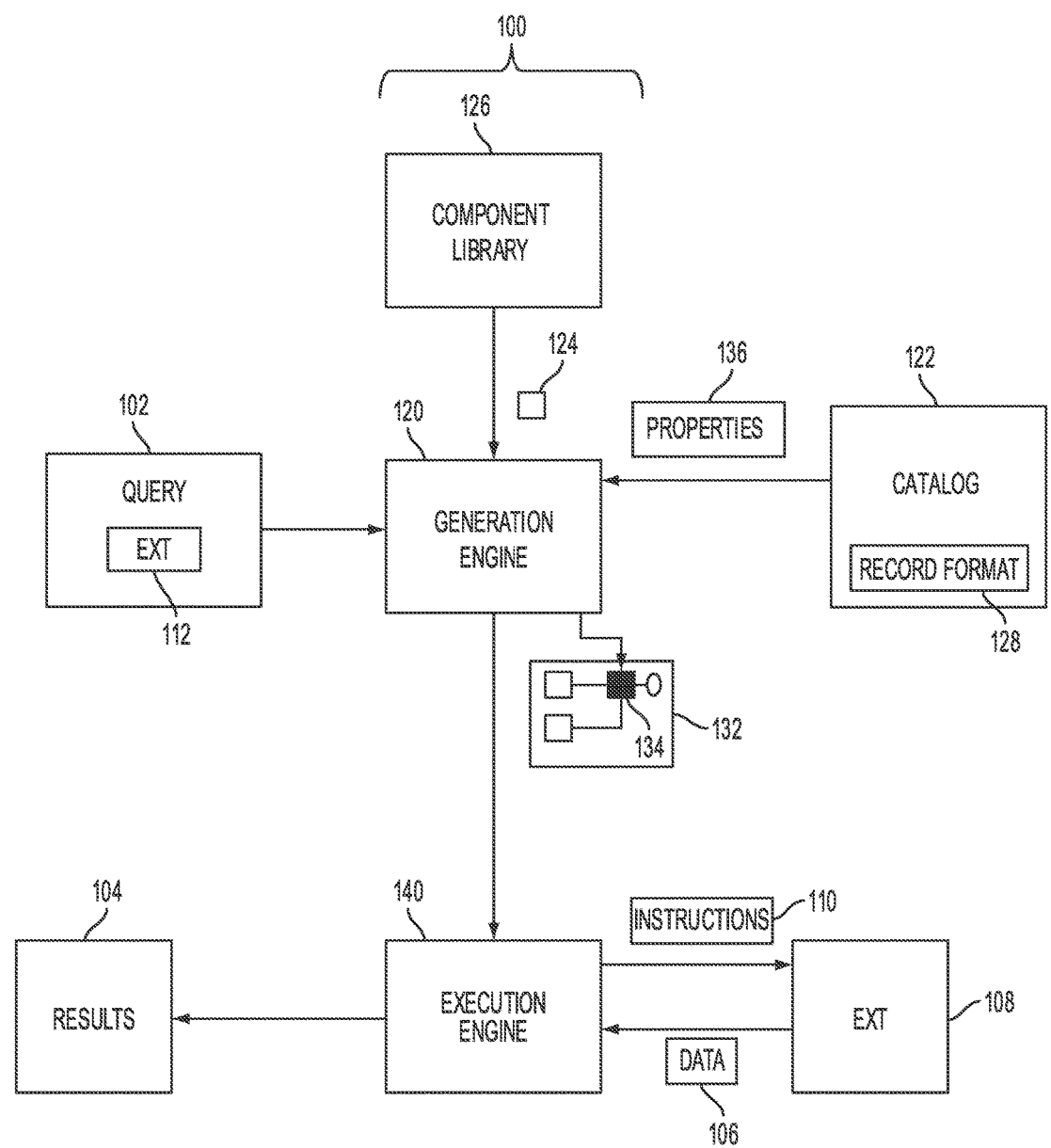
Figure 2C:
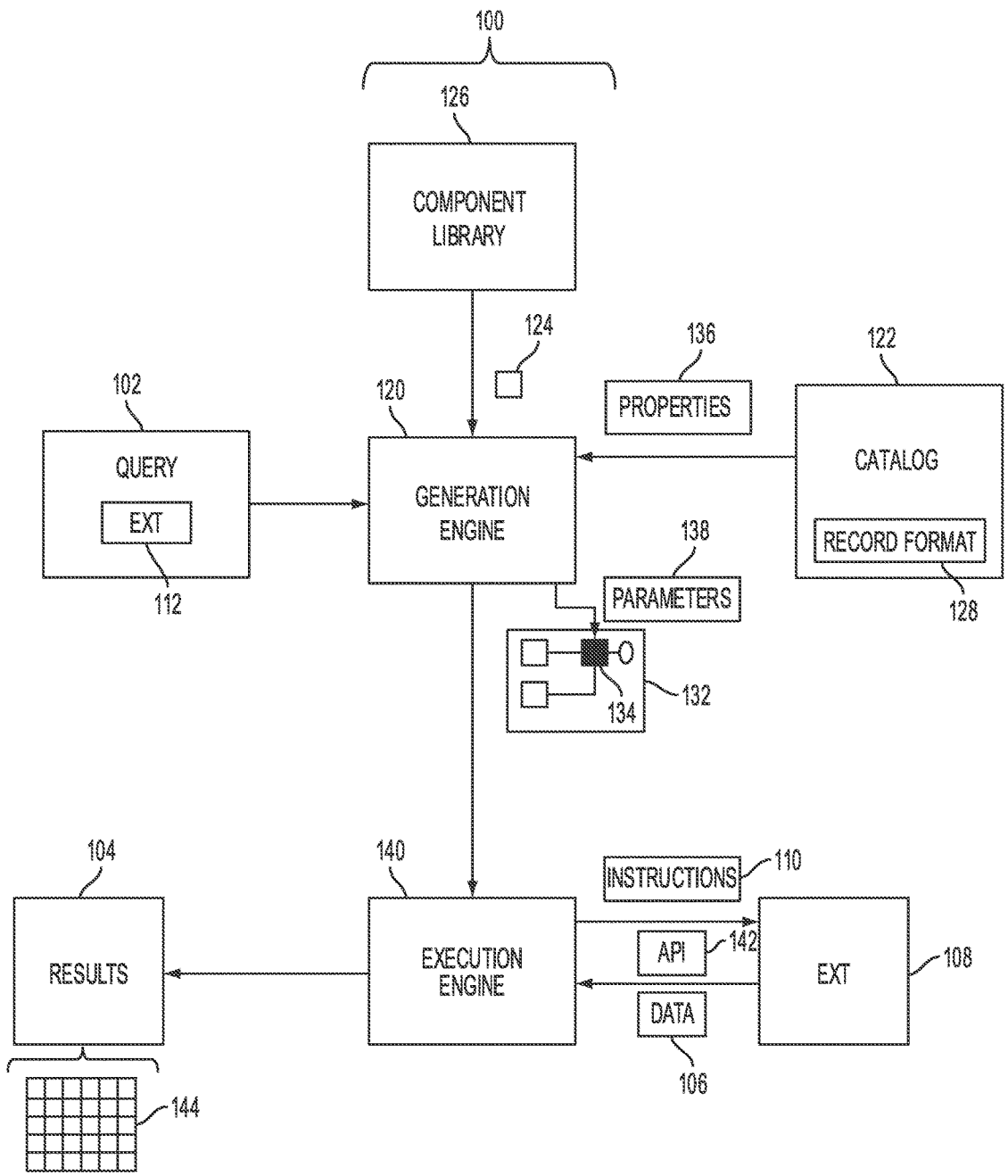

FIGS. 2A-2C show elements of the data processing system 100 that can be used to execute a query 102 that references an external resource 108. Referring to FIG. 2A, when the query 102 is received by the data processing system 100, the query 102 is provided to a computer program generation engine 120. The computer program generation engine 120 generates a computer program 132 that, when executed, carries out operations corresponding to the query 102. For example, the query 102 may be a SQL query, e.g., a query that contains one or more commands defined by the structured query language and arguments associated with the operations. In this example, the computer program 132 contains executable functionality that is equivalent to operations that perform the SQL query. When the computer program 132 is executed (e.g., by an execution engine 140), the computer program 132 executes based on the same arguments defined in the SQL query.

The data processing system 100 can carry out operations that perform the query 102 (a process sometimes referred to as executing the query 102) using techniques that do not rely on functionality of an RDBMS, e.g., query interpretation functionality of an RDBMS, to carry out the operations. Instead, the query can be carried out by executing the computer program 132. Once the computer program 132 is generated and configured, no query interpretation functionality of a relational database is used to generate output based on the query 102. Further, the data processing system 100 can execute the query 102 even if data sources identified in the query 102 are not databases that operate using queries in the form of the query 102. For example, the external resource 108 may not be configured to accept instructions specified in the form of SQL. If the query 102 is a SQL query and references the external resource 108 then the data processing system 100 can receive the query 102 and determine what operations should be performed, in response, when the computer program 132 is configured and executed, so that the output of the computer program 132 is equivalent to output of an execution of the query 102.

In this way, a SQL query can be used to retrieve data from systems other than relational database systems. Because SQL is a common language used to specify queries, many users know how to write SQL queries and many legacy systems are configured to automatically generate SQL queries. The techniques described here allows users and legacy systems to write or generate SQL queries, and the SQL queries can be carried out to retrieve data from external resources that do not have functionality for interpreting SQL queries. Further, data can be retrieved from an external resource by the data processing system 100, rather than copying data from the external resource to a relational database that executes SQL queries.

In some implementations, the computer program 132 includes a dataflow graph. A dataflow graph is a computer program that contains components representing operations to be performed on input data and links between the components (sometimes called nodes) representing flows of data. The operations represented by the components generate output data based on the input data by processing the input data. A component can provide input data to and receive output data from other components if the component is linked to the other components, in which each link between two components represents a flow of data from one of the components to the other component. A subset of components of a graph (e.g., one or more components of the graph) is sometimes referred to as a subgraph of the graph.

When the dataflow graph is executed by a graph-based processing system, each of the components is executed, e.g., a computer program or portion of a computer program is executed and carries out the operation represented by the component. During execution the dataflow graph receives input data which is processed (e.g., operated on by the operations of the dataflow graph's components) to generate output data.

Some or all of the components of a dataflow graph are each associated with information for invoking executable program code to perform the operation associated with the component. In some implementations, a data structure representing the dataflow graph can include data referencing executable code. The data structure can be used to instantiate the dataflow graph, by which we mean the data structure can be used to execute code that carries out operations associated with the dataflow graph. For example, a component may be associated with a reference to a computer program stored in computer-readable storage containing computer-executable instructions for carrying out the operation associated with the component, e.g., processing and outputting data.

In some examples, some or all components of a dataflow graph are each associated with information for making data available to the program code. For example, a component may be associated with function calls that can be invoked to deliver data to the executable program associated with the component, or the component may be associated with network ports that can receive data that is delivered to the executable program associated with the component, or the component may be associated with another technique for delivering data to the executable program associated with the component. In this way, each component can receive, process, and output data.

In some examples, a dataflow graph is parameterizable, by which we mean a dataflow graph can be configured using values of parameters when the dataflow graph is prepared for execution. An instance of a dataflow graph that is provided parameter values is sometimes called a parameterized instance of the dataflow graph. A parameter is a type of data that can be changed to change the behavior of the program to which the parameter belongs. For example, a value of a parameter can be provided to the program in order to change the way the program processes input data to produce output data. In the case of a dataflow graph, each component of a dataflow graph may be associated with one or more parameters. Similarly, one or more of the parameters may be associated with a single component or with multiple components.

One example of a graph-based system is described in detail in U.S. Publication No. 2007/0011668, titled "Managing Parameters for Graph-Based Applications," incorporated herein by reference. A system for executing graph-based computations is described in U.S. Pat. No. 5,966,072, titled "Executing Computations Expressed as Graphs," incorporated herein by reference. Further, components of a dataflow graph can be substituted for operations of a query 102. Techniques in accordance with this substitution are further described in U.S. Publication No. 2011/0179014A1, titled "Managing Data Queries," and U.S. Publication No. 2012/0284255A1, also titled "Managing Data Queries," incorporated herein by reference. In some implementations, a dataflow graph can be produced from a query 102.

Referring to FIG. 2B, in some examples, the computer program 132 includes a portion 134 that, when executed, communicates with the external resource 108. For example, the portion 134 may include executable functionality (e.g., executable program code) that is configured to transmit data to, and/or receive data from, the external resource 108. When the 134 is executed (e.g., program code of the portion 134 is interpreted and carried out by an execution engine), the computer program 134 transmits data to and/or receives data from the external resource 108. In some implementations, the portion 134 (as well as other portions of the computer program 132) may include program code that was provided to the data processing system 100 and is retrieved based on the identity of the external resource 108. For example, an application developer (not shown) may have written the program code of the portion 134 to comply with technical requirements of the external resource. In some implementations, the technical requirements include an application programming interface (API), described below. In some implementations, the portion 134 is a component of a dataflow graph, or a subgraph of a dataflow graph.

In some implementations, the computer program generation engine 120 generates the computer program 132 by accessing one or more pre-existing portions of a computer program and assembling the portions to form the computer program 132. For example, the computer program generation engine 120 may have access to a component library 126 that stores pre-existing components, e.g., pre-existing portions of executable program code. For example, a pre-existing component may be a component suitable for inclusion in a dataflow graph, or may be another graph (e.g., a subgraph) suitable for inclusion in a dataflow graph.

In some implementations, the component library 126 may include pre-existing components each of which corresponds to a particular kind of external resource 108. For example, the component library 126 may include a component 124 that corresponds to an external resource 108 indicated by the reference 112 in the query 102. In some examples, the component 124 may have been developed by a developer for the purpose of enabling the data processing system 100 to access the external resource 108 corresponding to the reference 112. A component 124 can be chosen from the component library 126 based on the identity of the external resource 108.

When the computer program generation engine 120 receives one or more components 124 (e.g., from the component library 126), the computer program generation engine 120 also configures the component 124 or components. In doing so, the computer program generation engine 120 generates a computer program 132 with configured portions. For example, the configured computer program 132 includes a configured portion 134 corresponding to the component 124 or components that include executable functionality for communicating with the external resource 108.

In some implementations, the configured portion 134 can be configured based on properties 136 received by the computer program generation engine 120. The properties 136 include data describing characteristics of the external resource 108. The data is used by the computer program 132 to determine how to send and receive data from the external resource 108. In some examples, the external resource 108 may send and receive data in a particular format. In these examples, the properties 136 can include a specification of the format of data to be sent and received from the external resource 108. In some examples, the external resource 108 may require the use of a credential such as a username and/or password. In these examples, the properties 136 can include a specification of the identifier. In some examples, the external resource 108 may be accessible at a particular address or other location. For example, the external resource 108 may be accessible at a particular IP (Internet Protocol) address, or a particular server name, or another type of address. In these examples, the properties 136 can include the address information.

The properties 136 can be received from a source that can be updated, e.g., in response to changes in operation of the external resource 108. For example, the properties 136 may be stored in a catalog 122 containing data representing properties corresponding to external resources 108 with which the data processing system 100 is capable of communicating. The catalog 122 could be a database, a flat file, or any other type of data storage mechanism. In some implementations, the catalog 122 is can be read from and written to by multiple entities at the same time. For example, the catalog 122 could be implemented as a database or other data storage technique that has functionality for managing concurrent data read and write operations. One example of functionality for managing concurrent data read and write operations is the use of locks or semaphores that indicate when a portion of data is being written to. One type of locking functionality that could be used is two-phase locking, in which one or more locks are acquired, a read or write operation is carried out, and then the locks are released. By managing concurrent data read and write operations, a single catalog 122 can be used by many instances of the generation engine 120. Further, a single catalog 122 can store properties 136 for many types of external resources 108. The properties 136 associated with any of the external resources 108 can be updated at any time, even if the number of external resources 108 supported by the catalog 122 is large enough such that the properties 136 are frequently accessed (e.g., such that at least some properties stored in the catalog 136 are read from or written to several times or more every second).

In some examples, if the external resource 108 changes in operation, any executable code for communicating with the external resource 108 (e.g., executable code that makes up part of an executable component 124) need not be changed; only the properties are updated. For example, the external resource 108 may change the way in which it provides output data to other systems. The properties 136 enable the computer program generation engine 120 to configure the portion 134 of the configured computer program 132 in a way that the configured portion 134 will be configured to accept data in the format that will be received from the external resource 108. Further, the configured computer program 132 can generate instructions 110 to be sent to the external resource and, when interpreted by the external resource 108, will cause the external resource 108 to send back data 106 responsive to the instructions 110. The instructions 110 can be formatted by the configured portion 134 based on a format of instructions specified by the properties 136. In some implementations, the format of instructions is derived from data stored in the catalog 122.

In some implementations, the catalog 122 includes information about record formats of data 106 of external resources 108 with which the data processing system 100 is capable of communicating. For example, the computer program 132 can use a record format 128 stored in the catalog 122 to interpret data 106 received from a corresponding external resource 108. In some examples, a record format 128 stored in the catalog 122 specifies a structure of data 106 that is received from the external resource 108. The record format may specify a structure of data in which the data is organized into records, such that each record has multiple fields. The computer program 132 can use the record format 128 to identify records and fields in data 106 received from the external resource 108. In some examples, the computer program 132 can use the record format 128 to interpret the data 106, for example, to translate the records and fields of the data to a different format (e.g., a format to be used in output of the computer program 132).

In some implementations, the computer program 132 can use the record format 128 of the catalog 122 to output data in a form that corresponds to the form expected of results of a SQL query. In some examples, a relational database management system returns data in the form of records and fields, e.g., in response to a SQL query. Thus, if the computer program 132 can also identify records and fields in data 106 from an external resource 108, the computer program 132 can provide output in the form of records and fields in response to a SQL query. This can be performed even if the data 106 received from the external resource 108 does not take the form of data typically received from a relational database, e.g., a database table.

In some implementations, the computer program 132 can be configured with parameters. For example, the parameters may be values that can be changed to change the behavior of the program. As a specific example, a parameter may be "filename" and the value of the parameter could be the location of a file in a file system. The value of the parameter can be changed to a location of a different file to configure the program to access the different file. Two instances of the same program (e.g, instances of the same executable program code) can be configured with different parameter values, which will change the behavior of the two instances of the same program.

Referring to FIG. 2C, the computer program generation engine 120 can use the properties to generate parameter values 138 which are used to configure the portion 134 of the configured computer program 132. In some examples, the computer program 132 may have a parameter corresponding to each of the properties 136. For example, the computer program 132 may have a parameter called "record_format" which is used to determine what format in which the computer program 132 will receive data 106. The computer program generation engine 120 can generate a parameter value 138 for the "record_format" parameter based on the record format received as part of the properties 136 for the external resource 108. As another example, the computer program 132 may have a parameter called "username" which is used to supply a username when connecting to the external resource 108. The computer program generation engine 120 can generate a parameter value 138 for the "username" parameter based on username data received as part of the properties 136 for the external resource 108.

In some implementations, the parameter values 138 are provided to the computer program 132 in the form of a parameter file in a format readable by the computer program 132. For example, the parameter file may be formatted in a data manipulation language (DML).

In some implementations, the computer program 132 is generated based on executable code associated with the external resource 108. For example, the catalog 122 may specify a location of executable code that, when the executable code is configured (e.g., using configuration data such as the properties 136), then the executable code can be used to communicate with the external resource 108. In this way, if the executable code is updated, e.g., by a system administrator or other entity who is authorized to change executable code, the catalog 122 stores the location of the updated executable code. When the computer program generation engine 120 generates the computer program 132, the computer program generation engine 120 can access the catalog to determine a location of the most up-to-date version of the executable code.

Once the computer program 132 is generated, an execution engine 140 receives the computer program 132. The execution engine 140 then executes the computer program 132, e.g., carries out instructions specified by program code associated with the computer program 132. When executed, the computer program 132 (e.g., the configured portion 134 of the computer program) generates instructions 110 and transmits the instructions 110 to the external resource 108. In some implementations, the external resource 108 exposes an API 142 (application programming interface) which is used to send instructions to and receive data from the external resource 108. In general, the API 142 can be any facility which enables the computer program 132 to interact with the external resource 108. For example, the API 142 may specify types of instructions that the external resource 108 is configured to receive and carry out. An example of an instruction typically specified by an API is a function call. A function is a portion of executable program code. When using a function call, the computer program 132 transmits, as part of the instructions 110, the name of a function and arguments to be passed to the function (e.g., used by the executable program code of the function). The instructions 110 may include many function calls, or other types of instructions, or both.

In some implementations, if the computer program 132 is a dataflow graph, the execution engine 140 includes a specialized operating system, sometimes called a graph operating system. A graph operating system is a computer program capable of executing the operations underlying individual components of a dataflow graph. For example, if a component of a dataflow graph represents an operation to be carried out by a data processing system, the graph operating system is tasked with instructing a data processing system to carry out the operation.

After sending the instructions 110 to the external resource 108, the computer program 132 receives data 106 from the external resource responsive to the instructions 110. The execution engine 140 then formats the received data 106 into results 104 of the query 102. In this way, the data processing system 100 can execute the query 102 to generate results 104 specified by the query.

In some implementations, the external resource 108 provides the data 106 in a format such as JSON (JavaScript Object Notation), which specifies data in the form of attribute-value pairs, or XML (Extensible Markup Language) which specifies data demarcated by tags indicating a category for the data. In some implementations, the record format 128 for the data 106 is stored in the catalog 122 in association with other data associated with the external resource 108 and can be used to interpret the JSON or XML data.

When the computer program 132 is executed by the execution engine 140, the computer program 132 (e.g., the results 104) is equivalent to output of a system (other than the execution engine 140) that executes the query 102 but does not execute the configured computer program 132. In this way, the computer program 132 is an example of a computer program that corresponds to the query 102. In some implementations, the computer program 132 formats the results 104 in the form of a database table 144. In this way, the data processing system 100 can execute a query 102, e.g., database query such as a SQL query) and provide the same kind of output that would be provided if a system such as an RDBMS executed the query 102 and provided results specified by the query.

Further, while a SQL query is typically used to retrieve data stored in a database table, the query 102 shown here can be used to retrieve data stored in any of several possible forms. The data 106 received from the external resource 108 may be in a form other than a database table (e.g., a relational database table), for example, a flat file. A flat file is a data file that does not contain structural relationships between elements of data. The data of the flat file may be capable of being represented in the form of records and fields. In some examples, the data 106 received from the external resource 108 may be in a format native to the external resource 108, by which we mean the data 106 may be in a format used by the external resource 108 to store and process data.

Figure 3:
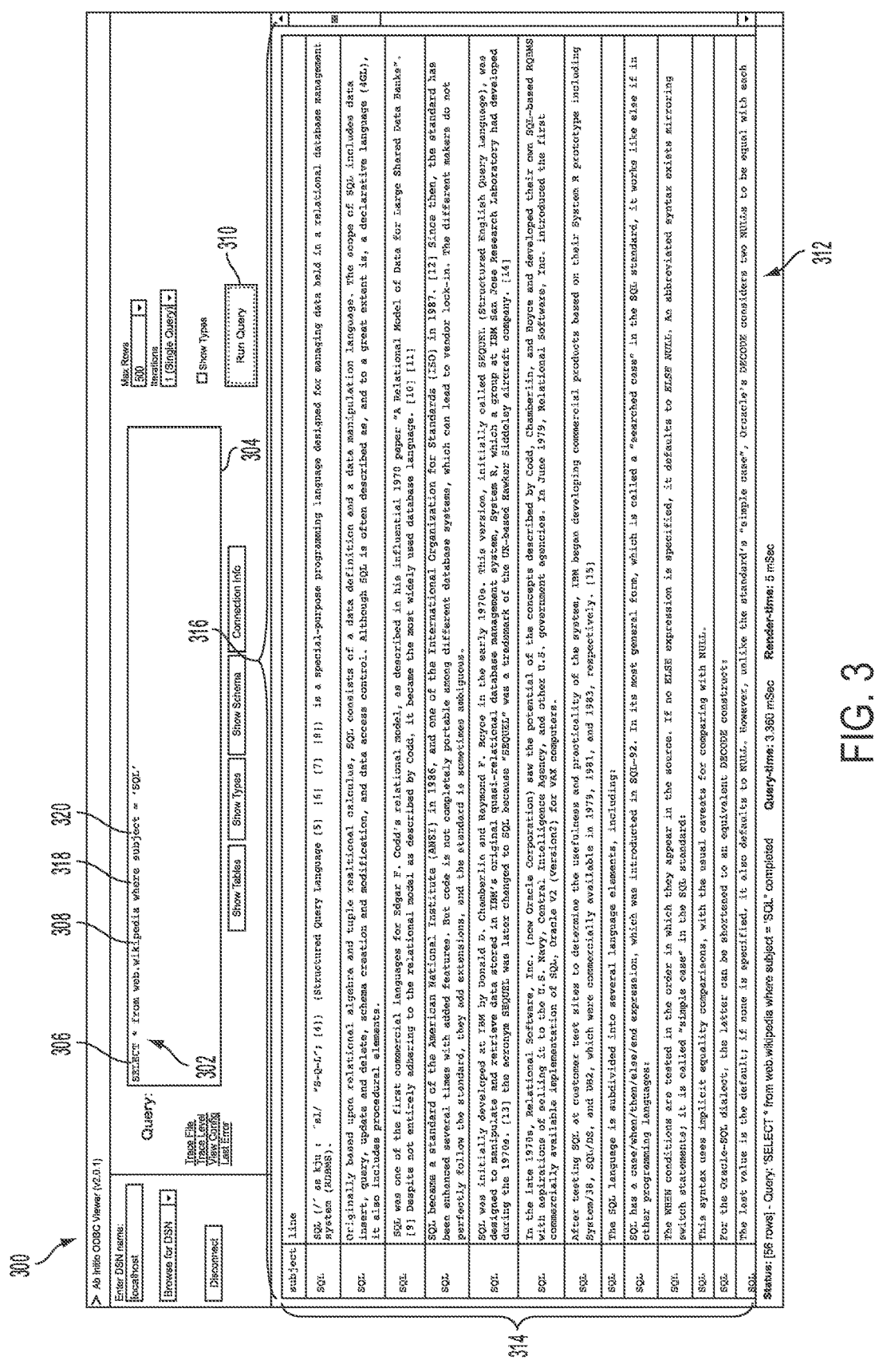

FIG. 3 shows a user interface 300 for executing a query. This user interface 300 is associated with data processing system 100 shown in FIGS. 1 and 2. This user interface 300 enables a user (not shown) to enter a SQL query 302 in a text box 304 of the user interface 300. The SQL query 302 includes a 'SELECT' command 306 and an argument 308 that is an identifier for a data source. Here, the argument 308 is "web.wikipedia." The argument "web.wikipedia" is associated with an external resource (e.g., the external resource 108 shown in FIG. 1).

In some examples, the data processing system 100 may store a list of identifiers and a list of external resources associated with each identifier. A number of techniques could be used to associate identifiers with external resources. In some examples, referring to FIGS. 2B-2C, the catalog 122 may store a list of identifiers, each corresponding to an external resource. For example, each identifier may correspond to references 112 included in queries 102 submitted to the data processing system 100. For example, the reference 112 may be the argument 308 "web.wikipedia" shown in the query 300 in FIG. 3. In this way, a reference 112 can be extracted from a query 102 and used to look up a corresponding external resource in the catalog 122. Further, the catalog may associate each identifier with a respective set of properties 136. The catalog 122 may associate each identifier with a reference to one or more components in the component library 126. In this way, a reference to an external resource can be used to identify, in the catalog 122, a corresponding set of properties and a reference to a corresponding component (e.g., a component 124 as shown in FIGS. 2B-2C). As another example, the component library 126 may store identifiers, e.g., may store an identifier for each component 124, so that an identifier (such as the name of an external resource) can be used to identify one or more corresponding components (e.g., a component 124 as shown in FIGS. 2B-2C).

As shown in FIG. 3, "web.wikipedia" is an identifier that references a web site called WIKIPEDIA available on the Internet via hypertext transfer protocol (HTTP). When a user clicks a Run Query button 310, the user interface 300 causes the data processing system 100 (FIG. 1) to execute the SQL query 302.

Once the SQL query 302 is executed, the results 312 of the execution are shown in the user interface 300. In this example, the results 312 are displayed in the form of a database table. The results 312 include rows 314 and columns 316 containing elements of data. Although the external resource associated with the argument 308 is not a relational database, the data processing system 100 enables the query 302 to be executed using the external resource (here, WIKIPEDIA) as a data source, and enables the results 312 to be formatted as a database table. For example, the results 312 can be formatted as a database table by identifying records and fields in the data returned by WIKIPEDIA. The identification can be performed by using a record format 128 (FIGS. 2B-2C) associated with WIKIPEDIA. Here, the query 302 included a 'where' command 318 indicating a criteria that must be satisfied by the results 312. The command 318 has an argument 320 of "subject='SQL'" (this type of argument is sometimes referred to as a predicate) which indicates that the results must include the term "SQL" in the text. Thus, the results 312 all include the term "SQL".

Figure 4A:
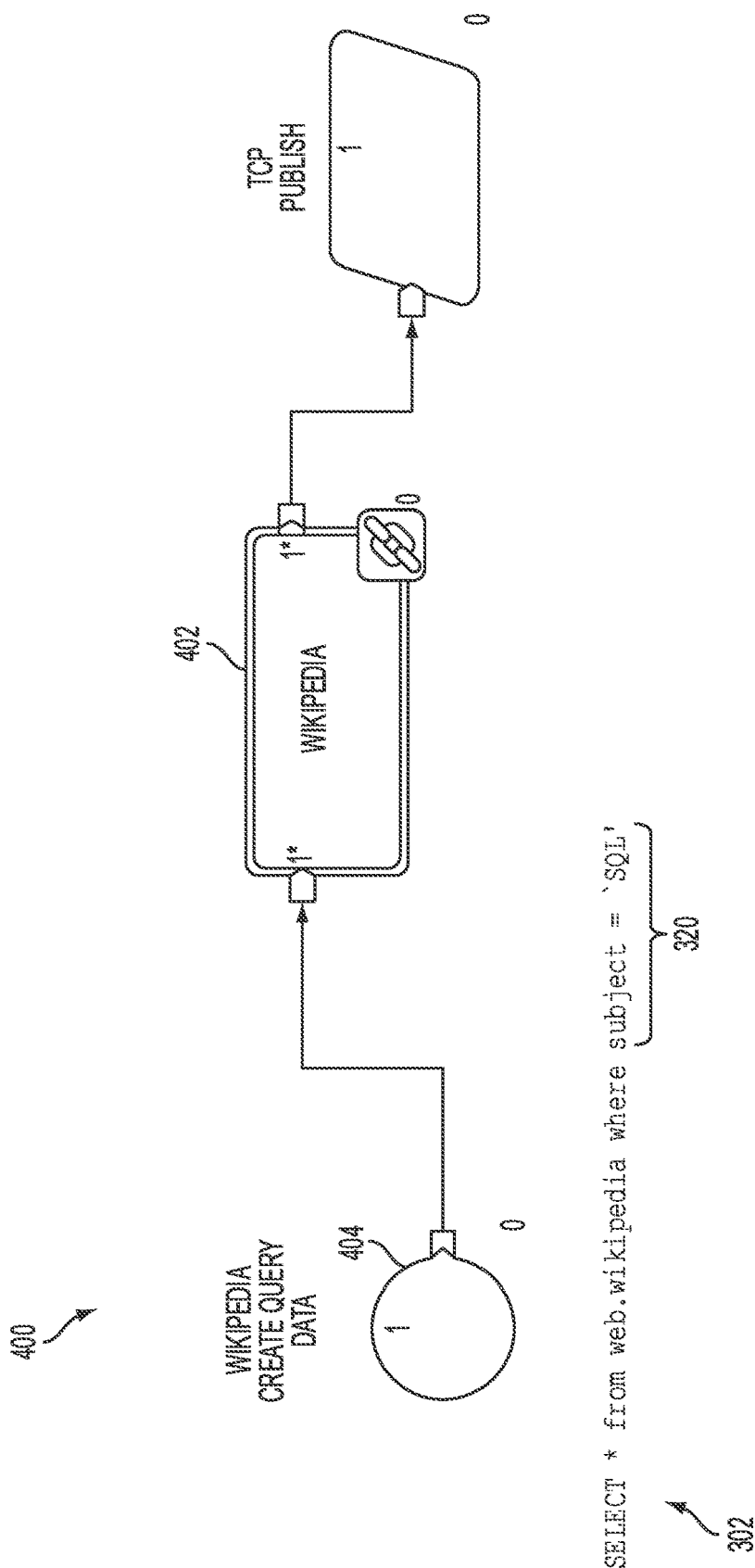
FIG. 4A shows a dataflow graph.

FIG. 4A shows a dataflow graph 400 generated in response to the execution of the query 302. The dataflow graph 400 is an example of the configured computer program 132 shown in FIGS. 2A-2C. In some implementations, the dataflow graph 400 may be a subgraph of another dataflow graph containing other components. When the query 302 is executed, the data processing system (FIGS. 1 and 2) generates and configures the dataflow graph 400. Further, the execution engine 140 (FIGS. 2A-2C) executes the dataflow graph 400 to generate the results 312 shown in FIG. 3. The dataflow graph 400 includes a component 402 representing an external resource 108 (FIG. 1) and a component 404 representing an input to the external resource 108. Here, the component 402 represents WIKIPEDIA. For example, the components 402, 404 may together be an example of the configured portion 134 shown in FIGS. 2B-2C. When the dataflow graph 400 is executed (e.g., by a graph operating system), the component 402 transmits instructions (e.g. the instructions 110 shown in FIGS. 1 and 2) to the external resource 108. The instructions are based on input data received from the input component 404. For example, WIKIPEDIA may expose a search query function which executes plain text queries submitted via hyptertext transfer protocol (HTTP). In this example, the component 402 is configured to transmit a plain text search query to WIKIPEDIA. For example, the SQL query 302 included an argument 320 of "subject='SQL'." Here, the input component 404 can be configured to provide the term "SQL" to the component 402 that communicates with WIKIPEDIA. In turn, the component 402 is configured to transmit the term "SQL" (e.g., received from the input component 404) as part of the plain text search query. In response to the plain text search query, the component 402 receives results via HTTP, which may be formatted according to hypertext markup language (HTML). The component 402 is also configured to parse the received HTML data and format the parsed data into a form such as a database table, e.g., the results 312 shown in FIG. 3.

In order to communicate with the WIKIPEDIA, the components 402, 404 are configured using properties (e.g., the properties 136 shown in FIGS. 2B-2C) specific to WIKIPEDIA. For example, the properties 136 may include information describing the format in which WIKIPEDIA provides search results, e.g., the particular HTML formatting used in the search results. In this way, if WIKIPEDIA changes the format of its output, the properties 136 (e.g., stored in the catalog 122 shown in FIGS. 2B-2C) can be updated (e.g., updated by an administrator user of the catalog 122) to reflect the updated format. When the component 402 that communicates with WIKIPEDIA is configured, the most recent version of the properties 136 can be accessed and used.

The components 402, 404 are configured with parameter values based on the properties. As an example, the component 404 may have a parameter called "input_text," and so the component 404 can be configured to use the text string "SQL" as the value for the "input_text" parameter. In this way, the criteria defined by the argument 320 defined in the SQL query is used when querying WIKIPEDIA.

In some implementations, the component 402 that communicates with an external resource such as WIKIPEDIA is made up of multiple executable components. In some examples, the component 402 may include one or more components that include executable instructions for establishing a network connection with one or more network resources. For example, the network resources may be servers that can provide data originating from WIKIPEDIA.

In some examples, the component 402 may include one or more components that include executable instructions for parsing data received from the external resource. For example, data received from WIKIPEDIA may include both data responsive to the SQL query 302 and other kinds of data, such as markup data (e.g., tags such as XML tags), metadata such as data describing a size or character set of the received data, or other data not responsive to the query. The components that include executable instructions for parsing data received from the external resource can process the data received from the external resource to separate the data responsive to the query from the data not responsive to the query. The data not responsive to the query may be discarded or used for another purpose. For example, data describing a size of the received data can be used to determine that an expected quantity of data has been received from the external resource.

In some examples, the component 402 may include one or more components that include executable instructions for formatting data received from the external resource. For example, the component 402 may provide output data (e.g., to other portions of the dataflow graph 400) that is formatted in a particular manner. The output data could be, for example, formatted as multiple lines of text, or multiple elements of an array, or another type of format. In some implementations, the components that include executable instructions for formatting data received from the external resource can receive parsed data (e.g., the data parsed by those components which include executable instructions for parsing data received from the external resource) and format the parsed data in a format specified for the output data of the dataflow graph 400. For example, the format specified for the output data of the dataflow graph 400 may be a format of a database table.

Figure 4B:
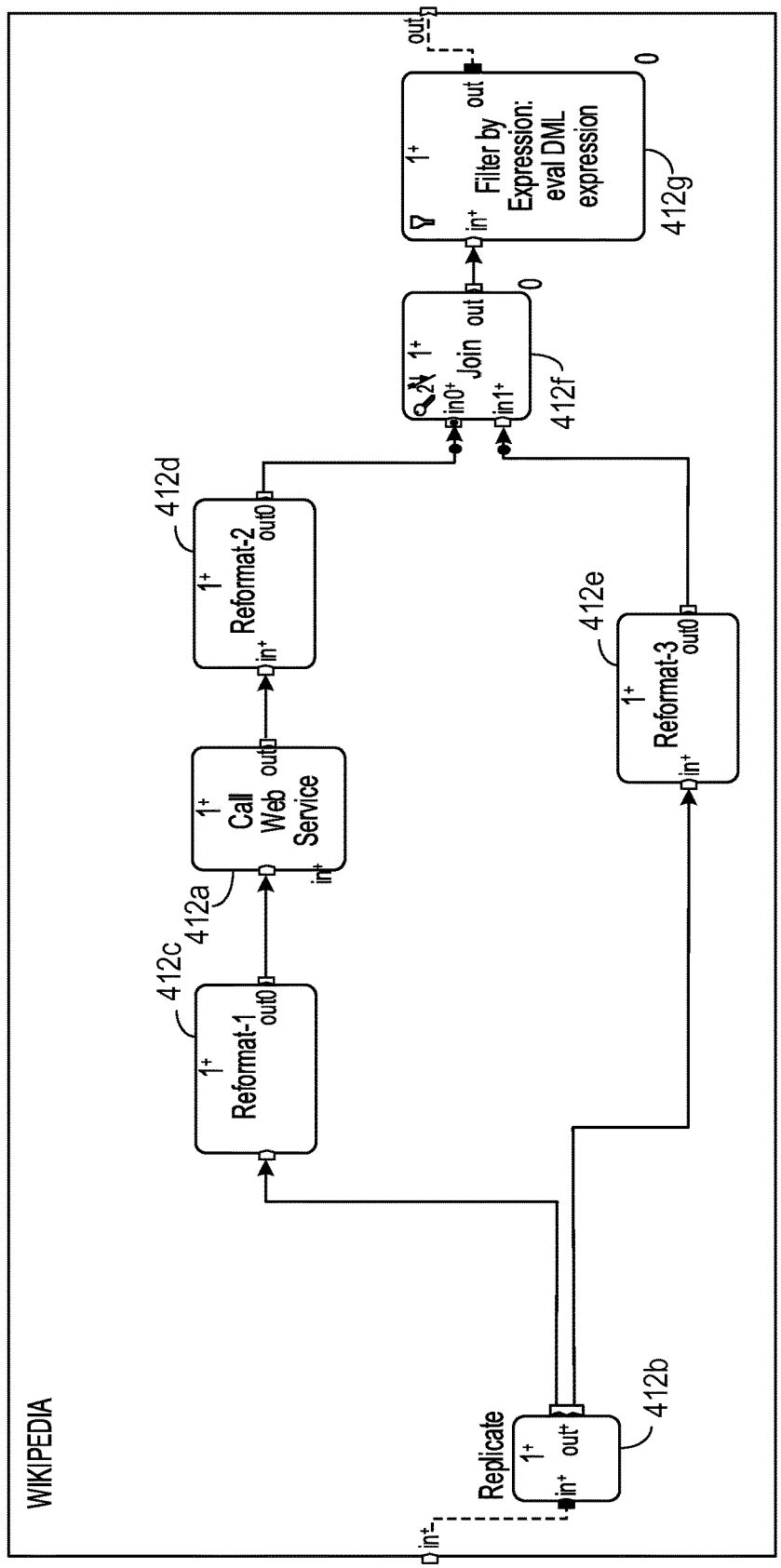
FIG. 4B shows a subgraph of a dataflow graph.

One type of component made up of multiple components is called a subgraph. FIG. 4B shows an example of a subgraph 410 containing components 412a-g that make up the component 402 that communicates with WIKIPEDIA.

The components 412a-g each include executable functionality that carries out a portion of the computational operations needed to communicate with WIKIPEDIA. For example, one component 412a is a "Call Web Service" component that includes executable code for communicating with a server on a network, e.g., a server that uses hypertext transfer protocol (HTTP). The "Call Web Service" component 412a transmits requests to the server and receives data in response to the request. In some implementations, the "Call Web Service" component 412a transmits a Simple Object Access Protocol (SOAP) request to the external resource. In some implementations, "Call Web Service" component 412a accesses an application programming interface (API) of the external resource.

The "Call Web Service" component 412a receives input specifying data to be transmitted in a request.

A replicate component 412b and a reformat component 412c prepare the data to be transmitted by the "Call Web Service" component 412a. For example, the replicate component 412b may receive data from the input component 404 shown in FIG. 4A. In some implementations, the reformat component 412c can then remove data that is inappropriate to transmit to the external resource. For example, some of the data may be inappropriate to transmit to the external resource, e.g., some of the data could be a search term that can be transmitted to search functionality of the external resource. In some examples, some of the data could be data that is not appropriate to transmit to the external resource. For example, the external resource may lack functionality for processing the data in a manner that is responsive to the original query (e.g., the query 102 shown in FIG. 1). As an example, some of the data may be a regular expression, and the external resource may lack functionality for evaluating regular expressions received by the search functionality of the external resource.

A second reformat component 412d changes a format of the data received from the external resource, e.g., parses and formats the data provided as output by the "Call Web Service" component 412a. For example, the data received from the "Call Web Service" component 412a may be tagged data such as XML data. The reformat component 412d can extract the data demarcated by the tags and output the extracted data in a format that does not use XML tags. The reformat component 412d may also remove data not needed in the output data. For example, the data discarded may be XML tags, or data demarcated by XML tags but that is not responsive to the query. In some implementations, the reformat component 412d uses a record format 128 (FIGS. 2B-2C) to interpret the structure of the data received from the "Call Web Service" component 412a, e.g., identify records and fields in the data received from the "Call Web Service" component 412a, before reformatting the data.

The replicate component 412b can also provide data to a third reformat component 412e. In some implementations, this reformat component 412e identifies the data that is inappropriate to transmit to the external resource that was remove by the first reformat component 412c. Here, the data that is inappropriate to transmit to the external resource can be provided by the reformat component 412e to a join component 412f which combines data received from two components.

The second reformat component 412d also provides its output to the join component 412f. Thus, the join component 412f provides output representing input from the second reformat component 412d and the third reformat component 412e.

A filter component 412g receives the output of the join component 412f. The filter component 412g removes data not responsive to the query (e.g., the query 102 shown in FIG. 1). As an example, the "Call Web Service" component 412a may output data not responsive to the original query because the "Call Web Service" component 412a was not provided one or more elements (e.g., portions) of the query. The one or more elements of the query may be a regular expression, which may not be appropriate to provide to the external resource represented by the "Call Web Service" component 412a. Here, the filter component 412g could receive the regular expression (e.g., as output by the third reformat component 412e to the join component 412f, and as removed by the first reformat component 412c from the output provided to the "Call Web Service" component 412a). The filter component 412g can filter the data first received from the "Call Web Service" component 412a based on the regular expression. Although the example of a regular expression is used here, the filter component 412g could filter the data based on other types of elements of the query or other types of criteria, e.g., criteria not specified in the query.

Each of the components of the subgraph 410 shown in FIG. 4B has its own executable code that is carried out when the subgraph 410 is executed. For example, FIG. 4C shows an example of the executable code 440 that makes up the Call Web Service component 412 shown in FIG. 4B. The executable code 440 includes code 442 for formatting requests to the external resource, code 444 for parsing output from the external resource, code 446 for transmitting a request to the external resource, and code 448 for providing output from the external resource to other components.

As described above with respect to FIGS. 2B-2C, a catalog 122 contains data corresponding to external resources 108 that the data processing system 100 is capable of communicating with. The data stored in the catalog 108, e.g, the properties 136, is used to configure a computer program 132.

As shown in FIG. 5A, in some implementations, a user interface 500 can be used to view and edit data stored in the catalog 122. The user interface 500 enables a user (e.g., an administrator of the catalog 122) to view and edit the data for an entry 502 in the catalog. An entry 502 of the catalog stores data relevant to a particular external resource, e.g., WIKIPEDIA. Although one example of a user interface 500 and an entry 502 is showed here, other types of catalogs may have other types of entries, and the other types of entries may contain different kinds of data.

This entry 502 includes data such as general information 504a about the entry. The entry 502 can also include a record format 504b of the external resource associated with the entry 502, which specifies the format of data received from the external resource, as described below. The entry 502 can also include indices 504c for the entry which specifies names for data that can be used to query the external resource associated with this entry 502, as described below. For example, the entry 502 can also include keys 504d for the entry. A key is used for data sources, such as relational databases, that store data in the form of records. A key an attribute for which record's stored value for the attribute is unique. The entry 502 can also include parameters 504e for the entry. In some implementations, referring to FIG. 2C, parameters. e.g., the parameters 138, are used to configure a computer program 132. In some implementations, the parameters 504e include data values for the properties 136 shown in FIGS. 2B-2C, which include data describing characteristics of the external resource associated with this entry 502. For example, the parameters 504e may include configuration data such as credentials (e.g., a username and password) used to gain authorized access to an external resource 108. The entry can also include permissions 504f for the entry 502, which indicate what entities (e.g., what users of the user interface 500 such as administrators of the catalog 122) can access and/or modify the entry 502. The entry can also include statistics 504g for the entry 502, which specify statistical data about the external resource 108 associated with this entry 502, e.g., statistical data such as the quantity of data available at the external resource 108.

As shown in FIG. 5A, the general information 504a of the entry includes a reference 506 to a path of stored executable code. In some implementations, referring to FIG. 1, the stored executable code is the portion 134 of the computer program 132 that communicates with the external resource 108. The reference 506 can be used by the generation engine 120 to access the stored executable code and use the stored executable code to generate the computer program 132.

As shown in FIG. 5B, the entry 502 can also include a record format 504b of the external resource associated with the entry 502. The record format 504b may be an example of the record format 128 shown in FIGS. 2B-2C. The record format 504b specifies the format of data received from the external resource. For examine, the record format 504b can include an embedded record format 508 and fields 510. The fields 510 specify names for data transmitted to and received from the external resource. For example, here the fields 510 are "subject," which is a name for data transmitted to WIKIPEDIA (e.g., a subject used in a query to the encyclopedia), and "line" which is a name for data received from WIKIPEDIA (e.g., lines of an encyclopedia entry corresponding to a subject). The embedded record format 508 specifies format information about the data provided to and received from the external resource. For example, this embedded record format 508 indicates that the "subject" and "line" fields are formatted using UTF-8, which is a particular kind of Unicode character encoding.

As shown in FIG. 5C, the entry 502 can also include indices 504c for the entry which specifies names for data that can be used to query the external resource associated with this entry 502. For example, this entry 502 has an index 514 called "subject." Thus, the external resource is configured to receive a data value for "subject" and return data responsive to the data value. For example, WIKIPEDIA may be configured to return encyclopedia entries where the data value appears in a "subject" field associated with each entry.

Figure 6A:
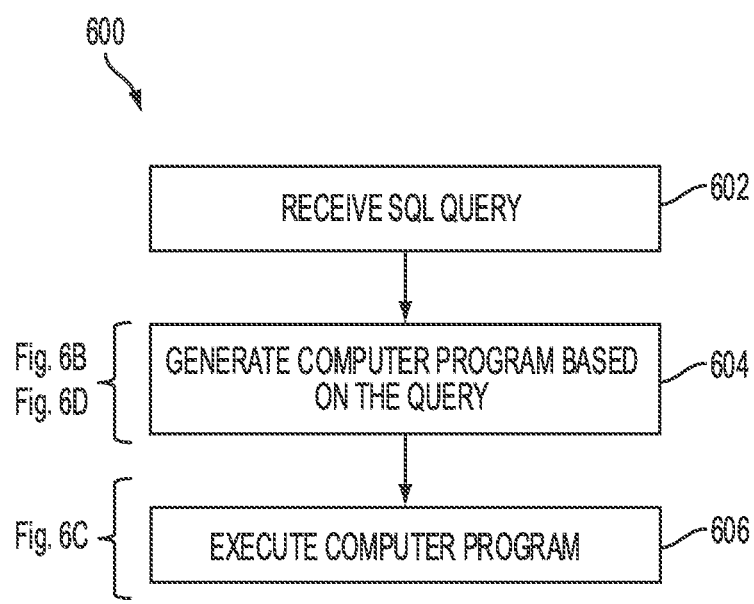
FIG. 6A-6D are flowcharts for processes associated with executing a query.

FIG. 6A shows a flowchart representing a procedure 600 for executing a query. The procedure 600 can be carried out, for example, by components of the data processing system 100 shown in FIG. 1.

The procedure receives 602 a SQL query. For example, the SQL query can be an example of the query 102 shown in FIG. 1. The SQL query includes an identifier associated with a resource that is external to the data processing system. Further, this resource is not a relational database management system. The resource could be the external resource 108 shown in FIG. 1. An example of an identifier is the argument 308 shown in FIG. 3.

The procedure generates 604 a computer program based on the SQL query. The computer program could be the computer program 132 shown in FIGS. 2A-2C. In some examples, the computer program includes components representing operations of the SQL query. In some examples, the computer program is a dataflow graph and the portion of the computer program that communicates with the external resource is a component or a subgraph of the dataflow graph. An example of a dataflow graph 400 is shown in FIG. 4A. In some implementations, the procedure 610 shown in FIG. 6B can be carried out during the generation of the computer program, e.g., to configure one or more portions of the computer program during generation of the computer program. In some implementations, the procedure 630 shown in FIG. 6D can be carried out to generate a data structure that can be used to instantiate the computer program, e.g., a dataflow graph.

The procedure executes 606 the computer program, e.g., based on parameter values used to configure the computer program. For example, the computer program may be executed by the execution engine 140 shown in FIGS. 2A-2C. In some implementations, the execution of the computer program corresponds to the procedure 620 shown in FIG. 5C.

Figure 6B:
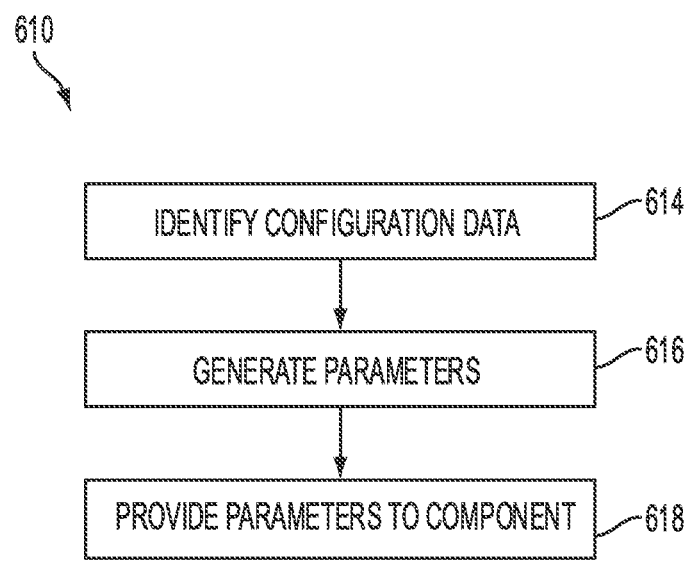

FIG. 6B shows a flowchart representing a procedure 610 used to configure a portion of a computer program when generating a computer program. In some implementations, the procedure 610 represents steps for generating 604 a computer program as shown in FIG. 6A. The procedure 610 can be carried out, for example, by components of the data processing system 100 shown in FIG. 1, such as the computer program generation engine 120. In some implementations, a computer program is generated by assembling multiple portions. Each portion may be configured while the computer program is being assembled. This procedure 610 can be used to configure a portion of the computer program being assembled.

The procedure identifies 614 configuration data associated with an external resource. For example, the external resource could be the external resource 108 shown in FIGS. 1 and 2. The configuration data specifies information used by a computer program to access the external resource and receive data from the external resource. In some implementations, the configuration data specifies a format of data to be received from the resource, e.g., the record format 128 shown in FIGS. 2B-2C. In some implementations, the configuration data specifies data used to access the resource on a network. For example, the configuration data can contain credentials, such as a username and password, used to obtain authorized access to data of the external resource, and/or the configuration data can contain a network address such as a host name or uniform resource locator (URL), and/or the configuration data can contain other kinds of data. For example, the configuration data could be an example of the properties 136 shown in FIGS. 2B-2C. In some examples, the configuration data is specified in a catalog that can be updated based on a change to a data format used by the resource.

The procedure generates 616 parameter values based on the configuration data. For example, the parameter values may be the parameter values 138 shown in FIG. 2C. In some implementations, a parameter generator receives data and generates a parameter file in a format readable by the computer program. The parameter file is then provided to the computer program. For example, the parameter generator could be a portion of the computer program generation engine 120 shown in FIG. 1. The data received by the parameter generator could be data of the properties 136 shown in FIGS. 2B-2C. For example, the parameter generator may parse the properties 136 to determine the parameter values 138.

The procedure provides 516 parameter values to a portion of the computer program. The portion is capable of communicating with the resource. For example, the portion of the computer program may be the configured portion 134 shown in FIGS. 2B-2C. The portion of the computer program includes executable instructions that define a manner in which the resource is accessed. Further, the executable instructions operate based on the parameters provided to the portion of the computer program.

The procedure 610 can be carried out for any portion of a computer program being generated. Once all portions of the computer program have been configured, the computer program is ready for execution.

Figure 6C:
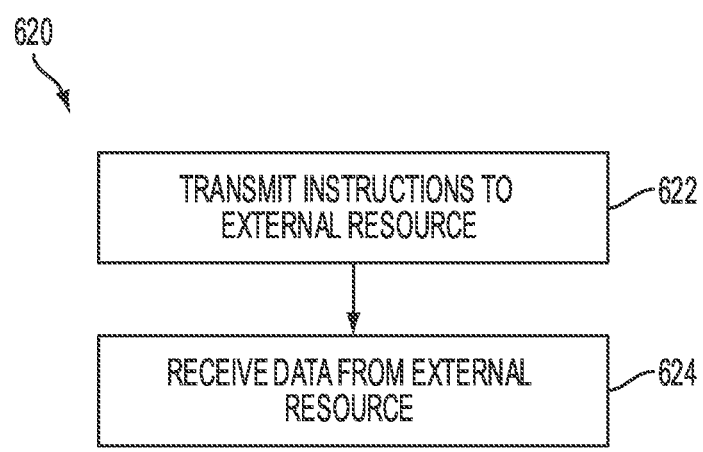

FIG. 6C shows a flowchart representing a procedure 620 for executing a computer program that corresponds to a query. In some implementations, the procedure represents steps for executing 606 a computer program as shown in FIG. 6A. The procedure 620 can be carried out, for example, by components of the data processing system 100 shown in FIG. 1, such as the computer program execution engine 140. The computer program could be the computer program 132 shown in FIGS. 2A-2C. For example, the procedure 620 can be initiated when the computer program execution engine 140 receives the computer program 132 and carries out operations corresponding to executable code of the computer program 132.

The execution of the computer program causes one or more instructions to be transmitted 622 to an external resource. For example, the external resource can be the external resource 108 shown in FIGS. 1 and 2. The instructions define operations other than operations of a SQL query corresponding to the computer program. For example, the instructions may be the instructions 110 shown in FIG. 1. In some examples, the instructions are transmitted to a facility of the external resource that does not return results in response to a SQL query, e.g., the instructions are not transmitted to a facility of the external resource that receives a SQL query as input, evaluates the SQL query, and responds with data specified by the SQL query. In this way, in some examples, the instructions do not include SQL instructions such as SQL commands or arguments. In some implementations, the resource is accessed using an application programming interface (API) exposed by the resource. An example of the API 142 is shown in FIG. 2C.

The execution of the computer program causes data to be received 624 from the resource in response to the instructions. For example, the data could be the results 104 shown in FIG. 1. The results may be formatted in the form of a database table, e.g., the database table 144 shown in FIG. 1. The data received from the resource in response to the instructions includes data specified by the SQL query. In this way, the received data is the same as data that would have been received from the external resource if the resource were provided a SQL query and, in response, the external resource returned data specified by the SQL query.

Figure 6D:
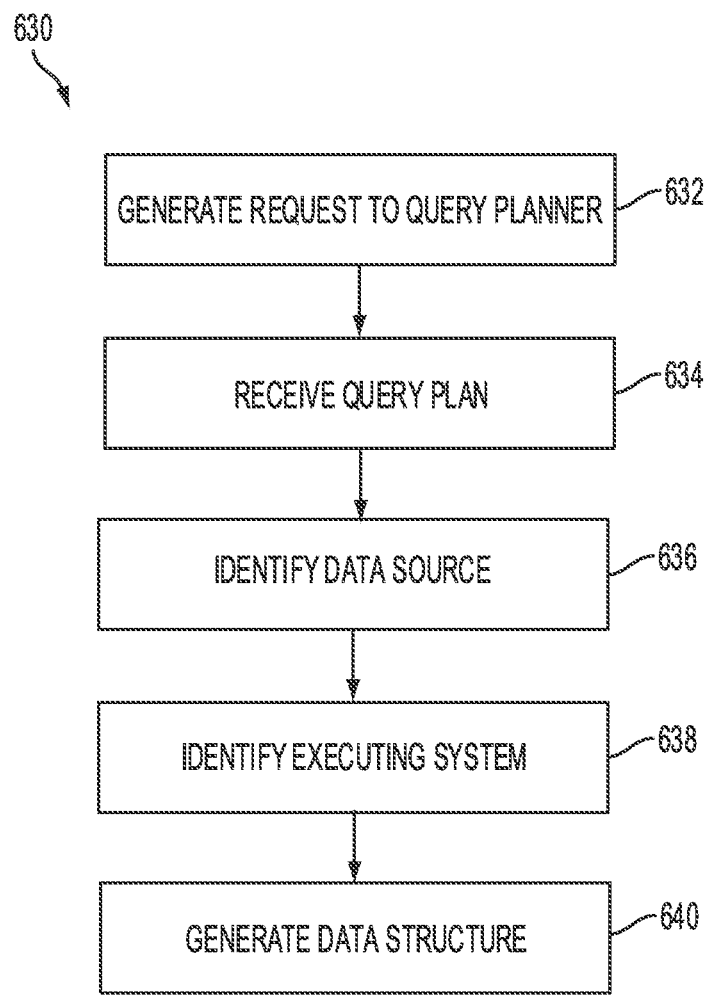

FIG. 6D shows a flowchart representing a procedure 630 for generating a data structure in a computer instantiating a dataflow graph that corresponds to a query. For example, the dataflow graph could be the computer program 132 shown in FIGS. 2A-2C. An example of dataflow graph 400 that corresponds to a query is shown in FIG. 4A.

A request to a query planner based on the query is generated 632. A query planner is a system that generates data that represents steps that can be carried out to execute a query. A query planner often generates the data in the form of steps that can be carried out by an RDBMS.

A query plan generated by the query planner based on the request is received 634. A query plan is data that represents a description of one or more steps to be performed by a system managing a relational database, e.g., an RDBMS.

A data source is identified 636, e.g, based on the query. The data source can be an external resource, e.g., the external resource 108 shown in FIGS. 1 and 2. The identification could be made based on a reference represented in the query, e.g., the reference 112 shown in FIG. 1. In some examples, the data source is identified based on an argument in the query.

An executing system other than a system managing a relational database is identified 638. The executing system could be a system that executes dataflow graphs. For example, the executing system could be the execution engine 140 shown in FIGS. 2A-2C. In contrast, an example of a system managing a relational database is an RDBMS.

A data structure instantiating a dataflow graph is generated 640. As described above with respect to FIGS. 2A-2C, a dataflow graph is a computer program that contains components representing operations to be performed on input data and links between the components (sometimes called nodes) representing flows of data.

The data structure includes a node that represents at least one operation to be executed. The node is associated with information usable by an executing system to invoke executable program code to perform the operation. The node is also associated with information usable by an executing system to make data available to the program code. At least one link of the dataflow graph represents output data of an operation of the node being provided as input data to an operation of another node of the dataflow graph.

The operation is chosen based on a step described by the query plan. In some implementations, the operation includes accessing data available at the data source. For example, the component 402 of the graph 400 shown in FIG. 4A is an example of a node that accesses data available at a data source external to the system executing the dataflow graph.

When the generated 640 dataflow graph is executed, program code based on the dataflow graph can be executed on the identified executing system. Further, data can be received from the data source. For example, the data can be received 624 as shown in FIG. 6C.

In some implementations of the procedures 600, 610, 620, 630 an API is used. When an API is used, the procedure 600 includes causing functions of the API to be executed in response to receiving the SQL query. The functions of the API are executable at the external resource. Further, the instructions transmitted to the resource (e.g., in the procedure 620 shown in FIG. 5C) cause the functions of the API to be executed. In this way, a SQL query can be used to query a resource that is not a relational database management system and does not interpret SQL queries.

The generation engine 120 and/or execution engine 140 shown in FIG. 1 may be hosted, for example, on one or more general-purpose computers under the control of a suitable operating system, such as a version of the UNIX operating system. For example, this can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The user interface 300 shown in FIG. 3 may be part of a development environment. The development environment is, in some implementations, a system for developing applications as dataflow graphs. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer-implemented method, performed by a data processing system, of executing a computer program based on a query that is expressed in accordance with a query language applicable to a relational database, the computer program executed based at least in part on data stored in a tangible, non-transitory computer-readable medium, the executing including:

receiving a SQL query, where the SQL query includes an identifier associated with a resource that is external to the data processing system;

generating the computer program based on the SQL query, including:

identifying a catalog including at least one entry associated with the resource, the at least one entry representing configuration data usable to configure a computer program to transmit instructions to the resource for the purpose of receiving data, identifying an executing system other than a system managing a relational database, generating a request to a query planner based on the SQL query, providing the request to the query planner, receiving a query plan generated by the query planner based on the request, the query plan including a description of one or more steps to be performed by a system managing a relational database, and generating the computer program based on the query plan, wherein at least a portion of the generated computer program is configured to communicate with the resource based on the at least one entry of the catalog;

receiving, from the identified catalog, the configuration data; and executing the computer program on the identified executing system, based on the configuration data, the execution of the computer program causing:

transmitting one or more instructions to the resource, the instructions defining operations other than operations of the SQL query, and receiving data from the resource in response to the instructions.

2. The method of claim 1 in which the computer program includes executable instructions that define a manner in which the resource is accessed, where the executable instructions operate based on the configuration data provided to the portion of the computer program.

3. The method of claim 1 in which the configuration data is specified in a catalog that can be updated based on a change to a data format used by the resource.

4. The method of claim 1 including generating parameter values based on the configuration data; and providing the parameter values to a portion of the computer program, the portion being capable of communicating with the resource;

the execution of the computer program being based on the parameter values.

5. The method of claim 4 in which generating parameter values based on the configuration data includes executing a parameter generator which generates a parameter file in a format readable by the portion of the computer program, and in which providing the parameter values to the portion of the computer program includes making the parameter file available to the portion of the computer program.

6. The method of claim 1 in which the SQL query includes a SELECT statement that includes an argument, where at least a portion of the argument corresponds to the identifier associated with the resource.

7. The method of claim 1 in which the computer program includes components representing operations of the SQL query.

8. The method of claim 1 in which the computer program is a dataflow graph and a subgraph of the dataflow graph performs the transmitting of the one or more instructions to the resource.

9. The method of claim 1 in which the resource is accessed using an application programming interface (API) exposed by the resource.

10. The method of claim 9 including
causing functions of the API to be executed in response to receiving the SQL query,
the functions of the API being executable at the resource, and the instructions transmitted to the resource causing the functions of the API to be executed.

11. The method of claim 1 including formatting the data received from the external resource in the form of a database table.

12. The method of claim 1 in which the resource is not a relational database management system.

13. The method of claim 1 in which the instructions are transmitted to a facility of the resource that does not return results in response to a SQL query.

14. The method of claim 1 in which the data received from the resource in response to the instructions includes data specified by the SQL query.

15. The method of claim 1 including identifying records and fields in the data received from the resource in response to the instructions, the records and fields identified based on a record format associated with the resource that is external to the data processing system.

16. The method of claim 1 in which generating the computer program based on the SQL query includes:
generating a data structure instantiating a dataflow graph that includes:
a first node that represents at least one operation to be executed,
the first node associated with information usable by an executing system to invoke executable program code to perform the operation,
the first node associated with information usable by an executing system to make data available to the program code,
the operation chosen based on a step described by the query plan, and
at least one link that represents output data of an operation of the first node being provided as input data to an operation of a second node of the dataflow graph.

17. A data processing system including a hardware processor and memory, the data processing system capable of executing a computer program based on a query that is expressed in accordance with a query language applicable to a relational database, the computer program executed based at least in part on data stored in a tangible, non-transitory computer-readable medium, the data processing system configured to perform operations including:
receiving a SQL query, where the SQL query includes an identifier associated with a resource that is external to the data processing system;
generating the computer program based on the SQL query, including:
identifying a catalog including at least one entry associated with the resource, the at least one entry representing configuration data usable to configure a computer program to transmit instructions to the resource for the purpose of receiving data,
identifying an executing system other than a system managing a relational database,
generating a request to a query planner based on the SQL query,
providing the request to the query planner,
receiving a query plan generated by the query planner based on the request, the query plan including a description of one or more steps to be performed by a system managing a relational database, and
generating the computer program based on the query plan, wherein at least a portion of the generated computer program is configured to communicate with the resource based on the at least one entry of the catalog;
receiving, from the identified catalog, the configuration data; and
executing the computer program on the identified executing system, based on the configuration data, the execution of the computer program causing:
transmitting one or more instructions to the resource, the instructions defining operations other than operations of the SQL query, and
receiving data from the resource in response to the instructions.

18. The system of claim 17 in which the computer program includes executable instructions that define a manner in which the resource is accessed, where the executable instructions operate based on the configuration data provided to the portion of the computer program.

19. The system of claim 17 in which the configuration data is specified in a catalog that can be updated based on a change to a data format used by the resource.

20. The system of claim 17, the operations including
generating parameter values based on the configuration data; and
providing the parameter values to a portion of the computer program, the portion being capable of communicating with the resource;
the execution of the computer program being based on the parameter values.

21. The system of claim 20 in which generating parameter values based on the configuration data includes executing a parameter generator which generates a parameter file in a format readable by the portion of the computer program, and
in which providing the parameter values to the portion of the computer program includes making the parameter file available to the portion of the computer program.

22. The system of claim 17 in which the SQL query includes a SELECT statement that includes an argument, where at least a portion of the argument corresponds to the identifier associated with the resource.

23. The system of claim 17 in which the computer program includes components representing operations of the SQL query.

24. The system of claim 17 in which the computer program is a dataflow graph and a subgraph of the dataflow graph performs the transmitting of the one or more instructions to the resource.

25. The system of claim 17 in which the resource is accessed using an application programming interface (API) exposed by the resource.

26. The system of claim 25, the operations including
causing functions of the API to be executed in response to receiving the SQL query,
the functions of the API being executable at the resource, and the instructions transmitted to the resource causing the functions of the API to be executed.

27. The system of claim 17 including formatting the data received from the external resource in the form of a database table.

28. The system of claim 17 in which the resource is not a relational database management system.

29. The system of claim 17 in which the instructions are transmitted to a facility of the resource that does not return results in response to a SQL query.

30. The system of claim 17 in which the data received from the resource in response to the instructions includes data specified by the SQL query.

31. The system of claim 17 including identifying records and fields in the data received from the resource in response to the instructions, the records and fields identified based on a record format associated with the resource that is external to the data processing system.

32. A non-transitory computer readable storage device storing instructions that enable a data processing system to execute a computer program based on a query that is expressed in accordance with a query language applicable to a relational database, the computer program executed based at least in part on data stored in a tangible, non-transitory computer-readable medium, the instructions causing the data processing system to perform operations including:
receiving a SQL query, where the SQL query includes an identifier associated with a resource that is external to the data processing system;
generating the computer program based on the SQL query, including:
identifying a catalog including at least one entry associated with the resource, the at least one entry representing configuration data usable to configure a computer program to transmit instructions to the resource for the purpose of receiving data,
identifying an executing system other than a system managing a relational database,
generating a request to a query planner based on the SQL query,
providing the request to the query planner,
receiving a query plan generated by the query planner based on the request, the query plan including a description of one or more steps to be performed by a system managing a relational database, and
generating the computer program based on the query plan, wherein at least a portion of the generated computer program is configured to communicate with the resource based on the at least one entry of the catalog;
receiving, from the identified catalog, the configuration data; and
executing the computer program on the identified executing system, based on the configuration data, the execution of the computer program causing:
transmitting one or more instructions to the resource, the instructions defining operations other than operations of the SQL query, and
receiving data from the resource in response to the instructions.

33. The computer readable storage device of claim 32 in which the computer program includes executable instructions that define a manner in which the resource is accessed, where the executable instructions operate based on the configuration data provided to the portion of the computer program.

34. The computer readable storage device of claim 32 in which the configuration data is specified in a catalog that can be updated based on a change to a data format used by the resource.

35. The computer readable storage device of claim 32, the operations including
generating parameter values based on the configuration data; and
providing the parameter values to a portion of the computer program, the portion being capable of communicating with the resource;
the execution of the computer program being based on the parameter values.

36. The computer readable storage device of claim 35 in which generating parameter values based on the configuration data includes executing a parameter generator which generates a parameter file in a format readable by the portion of the computer program, and
in which providing the parameter values to the portion of the computer program includes making the parameter file available to the portion of the computer program.

37. The computer readable storage device of claim 32 in which the SQL query includes a SELECT statement that includes an argument, where at least a portion of the argument corresponds to the identifier associated with the resource.

38. The computer readable storage device of claim 32 in which the computer program includes components representing operations of the SQL query.

39. The computer readable storage device of claim 32 in which the computer program is a dataflow graph and a subgraph of the dataflow graph performs the transmitting of the one or more instructions to the resource.

40. The computer readable storage device of claim 32 in which the resource is accessed using an application programming interface (API) exposed by the resource.

41. The computer readable storage device of claim 40, the operations including
causing functions of the API to be executed in response to receiving the SQL query,
the functions of the API being executable at the resource, and the instructions transmitted to the resource causing the functions of the API to be executed.

42. The computer readable storage device of claim 32 including formatting the data received from the external resource in the form of a database table.

43. The computer readable storage device of claim 32 in which the resource is not a relational database management system.

44. The computer readable storage device of claim 32 in which the instructions are transmitted to a facility of the resource that does not return results in response to a SQL query.

45. The computer readable storage device of claim 32 in which the data received from the resource in response to the instructions includes data specified by the SQL query.

46. The computer readable storage device of claim 32 including identifying records and fields in the data received from the resource in response to the instructions, the records and fields identified based on a record format associated with the resource that is external to the data processing system.

47. A data processing system capable of executing a computer program based on a query that is expressed in accordance with a query language applicable to a relational database, the computer program executed based at least in part on data stored in a tangible, non-transitory computer-readable medium, the data processing system including:
  means for receiving a SQL query, where the SQL query includes an identifier associated with a resource that is external to the data processing system;
  means for generating the computer program based on the SQL query, including:
    identifying a catalog including at least one entry associated with the resource, the at least one entry representing configuration data usable to configure a computer program to transmit instructions to the resource for the purpose of receiving data,
    identifying an executing system other than a system managing a relational database,
    generating a request to a query planner based on the SQL query,
    providing the request to the query planner,
    receiving a query plan generated by the query planner based on the request, the query plan including a description of one or more steps to be performed by a system managing a relational database, and
    generating the computer program based on the query plan, wherein at least a portion of the generated computer program is configured to communicate with the resource based on the at least one entry of the catalog;
  receiving, from the identified catalog, the configuration data; and
  means for executing the computer program on the identified executing system, based on the configuration data, the execution of the computer program causing:
  transmitting one or more instructions to the resource, the instructions defining operations other than operations of the SQL query, and
  receiving data from the resource in response to the instructions.

* * * * *